(12) United States Patent
Bulzacki

(10) Patent No.: US 9,639,746 B2
(45) Date of Patent: May 2, 2017

(54) SYSTEMS AND METHODS OF DETECTING BODY MOVEMENTS USING GLOBALLY GENERATED MULTI-DIMENSIONAL GESTURE DATA

(75) Inventor: Adrian Bulzacki, Mississauga (CA)

(73) Assignee: Arb Labs Inc., Mississauga (CA)

( * ) Notice: Subject to any disclaimer, the term of this patent is extended or adjusted under 35 U.S.C. 154(b) by 441 days.

(21) Appl. No.: 14/235,594

(22) PCT Filed: Apr. 18, 2012

(86) PCT No.: PCT/IB2012/000772
§ 371 (c)(1),
(2), (4) Date: Jan. 28, 2014

(87) PCT Pub. No.: WO2013/027091
PCT Pub. Date: Feb. 28, 2013

(65) Prior Publication Data
US 2014/0198954 A1    Jul. 17, 2014

Related U.S. Application Data

(60) Provisional application No. 61/512,528, filed on Jul. 28, 2011, provisional application No. 61/628,468, filed on Nov. 1, 2011.

(51) Int. Cl.
*G06K 9/00* (2006.01)
*G06K 9/62* (2006.01)

(52) U.S. Cl.
CPC ..... *G06K 9/00362* (2013.01); *G06K 9/00342* (2013.01); *G06K 9/6201* (2013.01)

(58) Field of Classification Search
None
See application file for complete search history.

(56) References Cited

U.S. PATENT DOCUMENTS 6,256,033 B1 *   7/2001   Nguyen ................. G06F 3/017
345/156
7,602,301 B1   10/2009   Stirling et al.
(Continued)

FOREIGN PATENT DOCUMENTS

CN          102103408 A        6/2011

OTHER PUBLICATIONS

Patent Cooperation Treaty, Written Opinion and International Search Report dated Aug. 24, 2012, issued on PCT Application No. PCT/IB2012/000772.

(Continued)

*Primary Examiner* — Avinash Yentrapati
(74) *Attorney, Agent, or Firm* — Norton Rose Fulbright Canada LLP

(57) ABSTRACT

The disclosure describes systems and methods of detecting body movements using gesture data. The gesture data may be self-referenced and may be comprised by frames which may identify locations or positions of body parts of a subject with respect to a particular reference point within the frame. A classifier may process frames to learn body movements and store the frames of gesture data in a database. Data comprising frames of self-referenced gesture data may be received by a recognizer which recognizes movements of the subject identified by the frames by matching gesture data of the incoming frames to the classified self-referenced gesture data stored in the database.

28 Claims, 12 Drawing Sheets

(56) References Cited

U.S. PATENT DOCUMENTS

| | | |
|---|---|---|
| 2004/0193413 A1 | 9/2004 | Wilson et al. |
| 2009/0298650 A1 | 12/2009 | Kutliroff |
| 2009/0316983 A1* | 12/2009 | Han .................. G06K 9/00342 382/159 |
| 2010/0208038 A1 | 8/2010 | Kutliroff et al. |
| 2010/0306712 A1 | 12/2010 | Snook et al. |
| 2011/0111798 A1 | 5/2011 | Jeon et al. |
| 2011/0169726 A1 | 7/2011 | Holmdahl et al. |
| 2012/0172126 A1* | 7/2012 | Padovani ................ G06F 3/011 463/36 |
| 2012/0214594 A1* | 8/2012 | Kirovski ................ A63F 13/06 463/36 |

OTHER PUBLICATIONS

European Patent Office, Supplementary European Search Report dated May 11, 2015, issued on European Application No. 12826260.
European Patent Office, Communication pursuant to Article 94(3) EPC dated Jun. 11, 2015, issued on European Application No. 12826260.7.
SIPO, Office Action for CN Application No. 2012800473485 dated Feb. 23, 2017.

\* cited by examiner

Represents points in 3D space, the points are in random positions but the number of points is constant

SYSTEMS AND METHODS OF DETECTING BODY MOVEMENTS USING GLOBALLY GENERATED MULTI-DIMENSIONAL GESTURE DATA

CROSS-REFERENCE TO RELATED APPLICATIONS

The present application claims priority to U.S. Provisional Patent Application Ser. No. 61/512,528, filed on Aug. 12, 2011, entitled "Crowd Sourcing Gesture Recognition System" and U.S. Provisional Patent Application Ser. No. 61/628,468, filed on Nov. 16, 2011, entitled "Crowd Sourcing Gesture Recognition System" both of which are incorporated by reference herein in their entirety.

FIELD OF THE INVENTION

The present invention relates to crowd sourcing based on multi-dimensional gesture data. More particularly, the present invention relates to systems and methods for crowd sourcing using multi-dimensional gesture data.

BACKGROUND

Gestures may be viewed as an important aspect of body language and may be used every day in communications between people. For many people, it may be difficult to avoid making some kind of gesture when communicating face to face with another person. Gestures may convey messages easily and seemingly wordlessly. Doing able to consistently and rapidly assess and perform gestures may form the basis of many forms of entertainment, including games that can be either cooperative or competitive in nature. Gestures may represent a variety of different things including emotions to representations of more concrete things such as intentions, people, places or things. Finding a way to differentiate between these forms of communication accurately may be beneficial for a variety of purposes.

Typically in the industry, the challenges of implementing gesture recognition systems would be overcome by using shape descriptors in combination with various processes as evidenced in the works of Prof. Ling Guan and Prof. Matthew Kyan and the published papers "Computerized Recognition of Human Gestures" by A. Bulzacki, L. Zhao, L. Guan and K. Raahemifar and "An Introduction to Gesture Recognition Through Conversion to a Vector Based Medium" by A. Bulzacki, L. Chan and L. Zhao. However, despite the general direction taken by these leaders in the field and their suggestion to continue on this path, the inventor took a different approach to solving the gesture recognition problem as disclosed below.

SUMMARY

Machines may have the potential to successfully classify a gesture quicker and mom efficiently than a human being through a process, such as machine learning. In a process, such as machine learning, a machine may be taught to recognize gestures. The potential for machine-based intelligence to categorize and detect different types of gestures may be used to expand the worlds of electronic communication, interactive entertainment, and security systems.

What actually defines a gesture, and what that gesture means may be a subjective view. Gestures may include one or more sequences of movements of a human body through a range of time. Gestures may also include a set of configurations or positions of the human body at a particular point in time. In some instances, gestures include a particular position of a human body at a particular instant or a specific point in time. A multitude of such particular positions through time may make up a sequence of movements, which may also be used to define a gesture. In some embodiments, an orientation or position of one or more body parts of a human body at a particular time, as well as the movement of these one or more body parts, such as joints, through time may define a gesture.

In one embodiment, hardware components that may be used in the field of gesture recognition research and applied techniques may be made available to the general public for home use and enterprises for industrial or professional use. Data comprising information about positioning and/or movement of joints may be stored for usage by a recognition system. Data comprising information about positioning and/or movement may include self-referenced features of data in which positions of body parts of a subject or locations of joints of a subject are referenced with respect to a particular location on the subject's body. In one instance, the data includes features identifying locations or positions of a subject's body parts and/or joints in reference to, or with respect to the subject's waist. In some instances, the self-referential data may be referenced with respect to any other body part or location on the subject's body. This self-referential data may used by a learning algorithm so that the learning algorithm may analyze the data and identify some key features of the self-referenced data for a particular body movement that may uniquely identify this particular body movement from all other movements of the subject. As the self-referenced data identifying the positioning and location of body parts with respect to a reference point within the data itself is provided to an artificially intelligent means or algorithms operating on a system, this algorithm may use the data to learn to detect and recognize a gesture of a person based on one or more consecutive frames of gesture data comprising such distinct identifying movement features.

In some embodiments, the same means or algorithms may be used to interpret or detect the future gestures or the intent of the person based on the person's current gesture and movement. In one example, the system may compare one or more frames of gesture data comprising self-referenced data features of an incoming fresh stream of data to one or more frames of gesture data previously processed by the "learning" system and stored in a database. Upon comparison, the system may identify that one or more distinct self-referential features of gesture data in the stored frames closely resemble the one or more self-referential features of the gesture data of the incoming stream. Upon the comparison, the system may determine that the two sets of frames match. In response to identifying that the one or more frames of data stored in a database correspond to a movement of a subject shooting a basketball, the system may determine that the subject whose body movements are referenced by the self-referenced gesture data of the incoming stream is also shooting a basketball. Similarly, a sequence of frames in which self-referenced gesture data identifying a person's body parts are in a category of "a waving person" may be detected as a waving person in response to a match of the sequence of frames of the incoming data comprising self-referenced gesture data to a stored set of frames of processed self-referenced gesture data identifying a waving person.

The embodiments of the methods and systems of the present disclosure may be distributed in any type of settings and to any type and form of customers, including end users, enterprises and third parties. In one example, the systems and methods described herein may be deployed to an enterprise, such as an airport security agency, for monitoring behavior of people on the airport and being on lookout for any threatening movements or signs of trouble. In such an embodiment, the enterprise may install a system at the airport which includes detection means, such as cameras, which record frames of data supplied for processing by the recognizing system that compares such incoming data against the gesture data used for detecting of movements. The gesture data used for detection of movements may be supplied by the same or another enterprise as a product. In some embodiments, the gesture data used for the system to learn the movements may be supplied by any number of users providing the gesture data identifying the movements via a network, where the data is generated during the course of the users playing a video game, such as the game of Charades in which players act out movements. In some embodiments, the gesture data used for learning may be provided by an enterprise that records crowds of people, such as for example a baseball stadium or football stadium where thousands of people are gathered. Data may be provided by any mix or third parties, end users or the enterprise providing the system. Once the data is provided and the system has learned the movements, the learned system may be deployed to any number of enterprises, sport events arenas, airports, concert arenas, or may be deployed to end users for use during the course of playing a video game or for any other type and form of an individual use.

The idea that the process of gesture recognition may be performed by machines may not only offer the convenience of automation and speed, but also open up the potential for artificial systems to participate in gesture-based communication and entertainment. Towards this goal, some form of artificial intelligence may be used to detect, learn or recognize which categories of gestures exist or which movements of a human body exist. As indicated earlier, using these learned categories or movements, systems and methods described herein may, upon detecting a particular movement in the future, predict from contextual (e.g. visual) cues the movement the system has previously learned. The systems described herein may be taught the movements using globally collected data of movements collected and observed from various human performers worldwide. For example, gesture data may be collected via the internet from various players of social and co-operative (or competitive) games which may play these games using electronic means, such as the Xbox by Microsoft Corp., Playstation video console by Sony Computer Entertainment or the Wii video console by Nintendo Co, or any other gaming systems or device. In some embodiments, gesture data is collected from players engaging in a gesture-based game in which the players attempting to perform gestures or recognize which gestures are being performed by others; thereby attempting to maximize their accuracy in both tasks. As indicated earlier, the data may be provided by entertainment or sports venues employing dozens of cameras recording people and thus providing unrehearsed and natural gesture data that can be processed for the purpose of teaching the system how to recognize genuine body movements. From collected information about the position and orientation of joints, limbs or other parts of a body during these performances, data may be created for artificial intelligent systems to learn these movements or categories of gestures which are subsequently used for detecting and recognizing movements of persons in the future.

In some aspects, the present disclosure relates to a method of identifying a movement of a subject based on data received via a network. The method may include receiving, by a system via a network, a frame. The frame may comprise one or more features of gesture data identifying one or more positions or locations of one, two or more body parts of a subject with respect to a reference point on the subject's body. In some embodiments, the reference point is the waist if the subject's body. A classifier may process the frame and assign the frame to a first movement. The frame may be stored into a database. A recognizer of the system may receive a new frame which may include a new gesture data identifying positions of one, two or more body parts of a new subject with respect to a reference point on the new subject's body. The reference point for the new gesture data may be the waist of the new subject's body. The recognizer may determine that movement of the new subject corresponds to the first movement responsive to comparing at least a portion of the new gesture data to the frame or one or more gesture data of the frame. In some embodiments, the recognizer makes the determination based on identifying that one or more features of the new gesture data match one or more features of the gesture data of the frame.

In some embodiments, the recognizer identifies within a first threshold of accuracy that the at least the portion of the new gesture data matches the at least the portion of the gesture data. The recognizer may further determine that the movement of the new subject is the first movement based on the identification within the first threshold. In some embodiments, the recognizer identifies within a second threshold of greater certainty than the first threshold of certainty that at least a second portion of the new gesture data matches at least a second portion of the gesture data. The recognizer determines with a greater certainty that the movement of the new subject corresponds to the first movement based on the identification within the second threshold. In some embodiments, a determination is made that the movement of the new subject corresponds to the first movement responsive to comparing one or more features of the gesture data of the frame to the one or more features of the new gesture data.

In some embodiments, the system stores the frame in a database, and determining that the movement of the new subject corresponds to the first movement upon comparing the one or more features of the new gesture data to the one or more features of the frame in the database. In further embodiments, a plurality of frames comprising gesture data is received via the network from a plurality of users at different geographical locations. The frame may be received via the network from a user of the plurality of users. The gesture data comprising the frame may be stored in a database. The frame may be retrieved from the database upon detecting that gesture data in the frame substantially matches the new gesture data.

In some embodiments, the recognizes compares a feature of the new gesture data identifying a position of a shoulder of the new subject with respect to the new subject's waist to a feature of the gesture data in the frame identifying the position of a shoulder of the subject with respect to the subject's waist. In further embodiments, the recognizer compares a feature of the new gesture data identifying a position of a hip of the new subject with respect to the new subject's waist to a feature of the gesture data in the frame identifying the position of a hip of the subject with respect to the subject's waist. In some embodiments, the recognizer compares a feature of the new gesture data identifying a position of an elbow of the new subject with respect to the new subject's waist to a feature of the gesture data in the frame identifying the position of an elbow of the subject with respect to the subject's waist. In further embodiments, the recognizer compares a feature of the new gesture data identifying a position of a palm of the new subject with respect to the new subject's waist to a feature of the gesture data in the frame identifying the position of a palm of the subject with respect to the subject's waist. In yet further embodiments, the recognizer compares a feature of the new gesture data identifying a position of one or more fingers of the new subject with respect to the new subject's waist to a feature of the gesture data in the frame identifying the position of one or more fingers of the subject with respect to the subject's waist.

In some embodiments, the recognizer compares a feature of the new gesture data identifying a position of a knee of the new subject with respect to the new subject's waist to a feature of the gesture data in the frame identifying the position of a knee of the subject with respect to the subject's waist. In further embodiments, the recognizer compares a feature of the new gesture data identifying a position of a heel of the new subject with respect to the new subject's waist to a feature of the gesture data identifying the position of a heel of the subject with respect to the subject's waist. In yet further embodiments, the recognizer compares a feature of the new gesture data identifying a position of toes of the new subject with respect to the new subject's waist to a feature of the gesture data identifying the position of toes of the subject with respect to the subject's waist. In some embodiments, the recognizer compares a feature of the new gesture data identifying a position a portion of the head of the new subject with respect to the new subject's waist to a feature of the gesture data in the frame identifying the position of a portion of the head of the subject with respect to the subject's waist. To some embodiments, the recognizer compares a feature of the new gesture data identifying a position of the neck of the new subject with respect to the new subject's waist to a feature of the gesture data in the frame identifying a position of the neck of the subject with respect to the subject's waist. In yet further embodiments, the recognizer compares a feature of the new gesture data identifying a position of a pelvis of the new subject with respect to the new subject's waist to a feature of the gesture data in the frame identifying the position of a pelvis of the subject with respect to the subject's waist. In some embodiments, the recognizer compares a feature of the new gesture data identifying a position of a belly of the new subject with respect to the new subject's waist to a feature of the gesture data in the frame identifying the position of a belly of the subject with respect to the subject's waist. In further embodiments, wherein the positions of one or more body parts are expressed as one or more distances between the one or more body parts of the subject and the waist of the subject and wherein the values indicating the one or more distances are scaled and normalized to values between 0 and 1.

In some embodiments, the system receives from a detector the frame comprising gesture data. The detector may include a camera that comprises a functionality to extrapolate self-referential gesture data. In further embodiments, the recognizer receives from a different detector the new gesture data, the different detector comprising a different camera that comprises the functionality to extrapolate self-referential gesture data. In some embodiments, the camera is a Microsoft Kinect Camera.

In some aspects, the present disclosure relates to a system for identifying a movement of a subject based on data. The system may include a database storing a frame received via a network, the frame comprising gesture data identifying positions or one or more body parts of a subject with respect to waist of the subject's body. The system may further include a classifier assigning the frame to a first movement. A recognizer may receive a new gesture data identifying positions of one or more body parts of a new subject with respect to waist or the new subject's body, wherein the recognizer determines that a movement of the new subject corresponds to the first movement responsive to comparing at least a portion of the new gesture data to the at least a portion of the gesture data in the frame stored in the database.

In some embodiments, the recognizer determines within a first threshold of certainty that the movement of the new subject corresponds to the first movement. In some embodiments, the recognizes additionally determining within a second threshold of greater certainty than the first threshold, that the movement of the new subject corresponds to the first movement responsive to comparing the new gesture data to a second frame assigned to the first movement. In further embodiments, the system determines that the movement of the new subject corresponds to the first movement responsive to comparing the one or more positions of the frame to the one or more positions of the new gesture data. In still further embodiments, the system determines that the movement of the new subject corresponds to the first movement upon comparing the one or more positions identified by the new gesture data to the one or more positions identified by the gesture data in the frame. In yet further embodiments, a plurality of frames comprising the gesture data are received via the network from a plurality of users at different geographical locations, and wherein the frame is received via the network from a user of the plurality of users.

DETAILED DESCRIPTION

Figure 1:
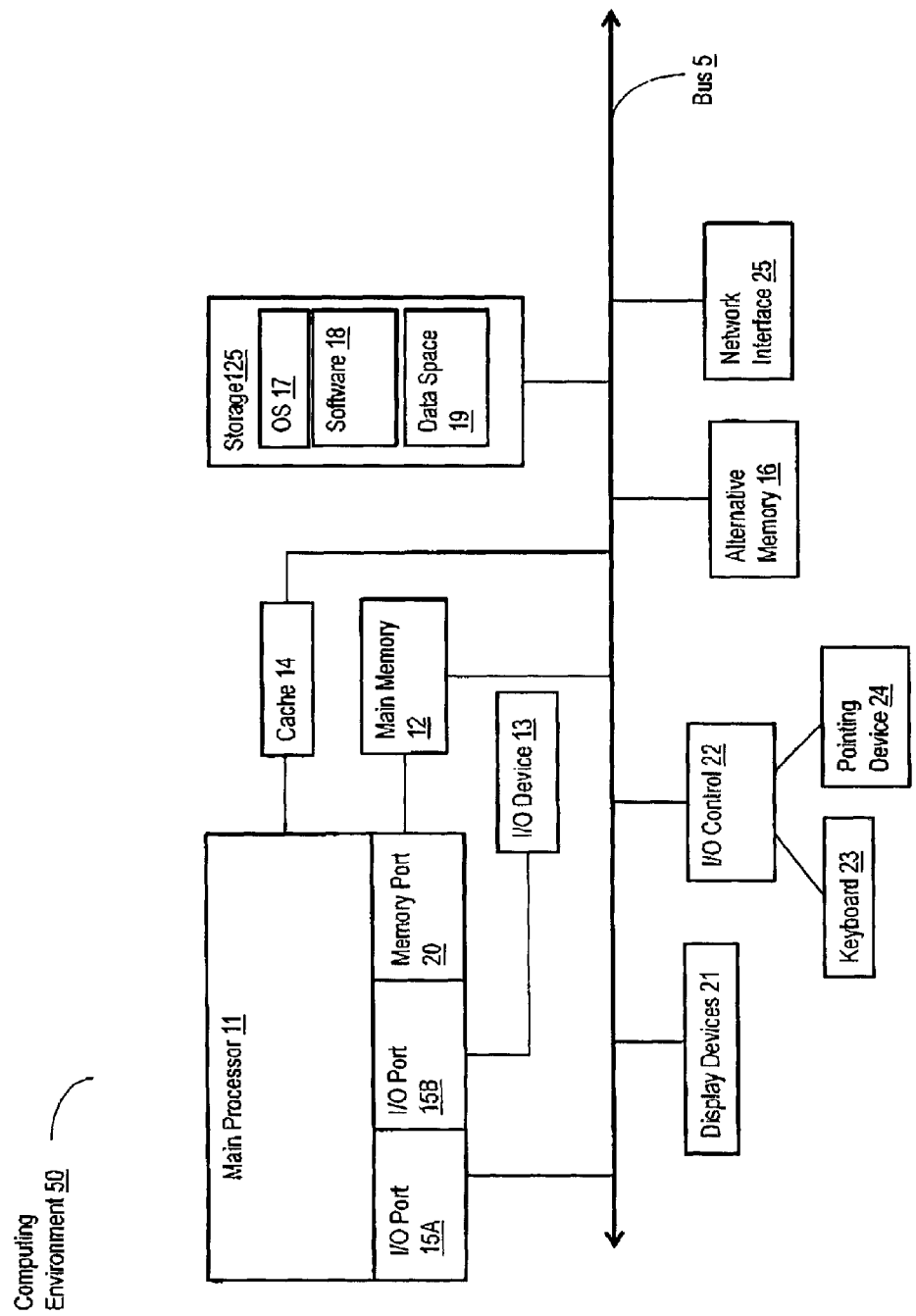
FIG. 1 illustrates a block diagram of an embodiment of a computing environment in which the features of the present invention are executed and implemented.

Referring now to FIG. 1, an embodiment of a computing environment 50 in which the features of the present invention may be implemented is illustrated. In brief overview, devices or systems described herein may include functions, algorithms or methods that may be implemented or executed on any type and form of computing device, such as a computer, a mobile device, a video game device or any other type and form of a network device capable of communicating on any type and form of network and performing the operations described herein. FIG. 1 depicts a block diagram of a computing environment 50, which may be present on any device or system, such as a remote crowding device or crowd sourcing system described later. Computing environment 50 may include hardware and combinations of hardware and software providing the structure on a computing device on which the embodiments of the present disclosure are practiced. Each computing device or a system includes a central processing unit also referred to as a main processor 11 that includes one or more memory ports 20 and one or more input output ports, also referred to I/O ports 15, such as the I/O ports 15A and 15B. Computing environment 50 may further include, a main memory unit 12 which may be connected to the remainder of the components of the computing environment 50 via a bus 5 and/or may be directly connected to the main processor 11 via memory port 20. The computing environment 50 of a computing device may also include a visual display device 21 such as a monitor, projector or glasses, a keyboard 23 and/or a pointing device 24, such as a mouse, interfaced with the remainder of the device via an I/O control 22. Each computing device 100 may also include additional optional elements, such as one or more input/output devices 13. Main processor 11 may comprise or be interfaced with a cache memory 14. Storage 125 may comprise memory which provides an operating system, also referred to as OS 17, additional software 18 operating on the OS 17 and data space 19 in which additional data or information may be stored. Alternative memory device 16 may be connected to the remaining components of the computing environment via bus 5. A network interface 25 may also be interfaced with the bus 5 and be used to communicate with external computing devices via an external network.

Main processor 11 includes any logic circuitry that responds to and processes instructions fetched from the main memory unit 122. Main processor 11 may also include any combination of hardware and software for implementing and executing logic functions or algorithms. Main processor 11 may include a single core or a multi core processor. Main processor 11 may comprise any functionality for loading an operating system 17 and operating any software 18 thereon. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; those manufactured by Advanced Micro Devices of Sunnyvale, Calif., or any computing unit for performing similar functions. The computing device may be based on any of these processors, or any other processor capable of operating as described herein.

Main memory unit 12 may include one or more memory chips capable of storing data and allowing any storage location to be directly accessed by the microprocessor 101, such as Static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 12 may be based on any of the above described memory chips, or any other available memory chips capable of operating as described herein. In some embodiments, the main processor 11 communicates with main memory 12 via a system bus 5. In some embodiments of a computing device comprising computing environment 50, the processor communicates directly with main memory 122 via a memory port 20.

FIG. 1 depicts an embodiment in which the main processor 11 communicates directly with cache memory 14 via a connection means, such as a secondary bus which may also sometimes be referred to as a backside bus. In other embodiments, main processor 11 communicates with cache memory 14 using the system bus 5. Main memory, I/O device 13 or any other component of the computing device comprising a computing environment 50 may be connected with any other components of the computing environment via similar secondary bus, depending on the design. Cache memory 14 however may typically have a faster response time than main memory 12 and may be include, a type of memory which may be considered faster than main memory 12, such as for example SRAM, BSRAM, or SDRAM. Cache memory may include any structure such as multilevel caches. In some embodiments, the main processor 11 communicates with one or more I/O devices 13 via a local system bus 5. Various busses may be used to connect the main processor 11 to any of the I/O devices 13, such as a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 21, the main processor 11 may use an Advanced Graphics Port (AGP) to communicate with the display 21. In some embodiments, main processor 11 communicates directly with I/O device 13 via HyperTransport, Rapid I/O, or InfiniBand. In further embodiments, local busses and direct communication are mixed. For example, the main processor 11 communicates with I/O device 13 using a local interconnect bus while communicating with I/O device 13 directly. Similar configurations may be used for any other components described herein.

Computing environment 50 of a computing device may further include alternative memory, such as a floppy disk drive for receiving floppy disks such as 3.5-inch, 5.25-inch disks or ZIP disks, a CD-ROM drive, a CD-R/RW drive, a DVD-ROM drive, a BlueRay disc, a tape drive of any format, a USB device, a hard-drive or any other device suitable for storing data or installing software and programs. Computing environment 50 may further include a storage device 125 which may include one or more hard disk drives or redundant arrays of independent disks, for storing an operating system, such as OS 17, software 18 and/or providing data space 19 for storing additional data or information. In some embodiments, an alternative memory 16 may be used as the storage device 125. Additionally, OS 17 and/or the software 18 may be run from a bootable medium, for example, a bootable CD, such as KNOPPIX®, a bootable CD for GNU/Linux that is available as a GNU/Linux distribution from knoppix.net.

Computing environment 50 may include a network interface 25 to interface to a Local Area Network (LAN), Wide Area Network (WAN) or the Internet through a variety of connections including, but not limited to, standard telephone lines, wired or wireless connections, LAN or WAN links (e.g., 802.11, T1, T3, 56 kb, X.25), broadband connections (e.g., ISDN, Frame Relay, ATM), or some combination of any or all of the above. The network interface 25 may comprise a built-in network adapter, network interface card, PCMCIA network card, card bus network adapter, wireless network adapter, USB network adapter, modem or any other device suitable for interfacing the computing device to any type of network capable of communication and performing the operations described herein.

Still referring to FIG. 1, I/O devices 13 may be present in various shapes and forms in the computing environment 50. Input devices may include joysticks, keyboards, mice, trackpads, trackballs, microphones, drawing tablets, gloves, video game components for inputting video game data or a video camera. Output devices may include video displays, speakers, transceivers for sending and receiving data. I/O devices 13 may be controlled by an I/O control 22. The I/O control 22 may control one or more I/O devices such as a keyboard 23 and a pointing device 24, e.g., a joystick, a mouse or an optical pen. I/O control 22 may also comprise an interface between an external detector, such as a video camera or a microphone and the computing device. I/O control 22 may enable any type and form of a detecting device, such as a video camera to be interfaced with other components or the computing environment 50. Furthermore, an I/O device 13 may also provide storage 125 and/or an alternative memory 16 for the computing device. In still other embodiments, the computing device may provide USB connections to receive handheld USB storage devices such as the USB Flash Drive line of devices manufactured by Twintech Industry, Inc. of Los Alamitos, Calif.

In some embodiments, the computing environment may comprise or be connected to multiple display devices 21. Display devices 21 may each be of the same or different type and/or form, I/O devices 13 and/or the I/O control 22 may comprise any type and/or form of suitable hardware, software, or combination of hardware and software to support, enable or provide for the connection and use of multiple display devices 21 or multiple detection devices, such as detector 105 described below.

In one example, computing device includes any type and/or form of video adapter, video card, driver, and/or library to interface, communicate, connect or otherwise use the display devices 21 or any I/O devices 13 such as video camera devices. In one embodiment, a video adapter may comprise multiple connectors to interface to multiple display devices 21. In other embodiments, the computing device may include multiple video adapters, with each video adapter connected to one or more of the display devices 21. In some embodiments, any portion of the operating system of the computing device may be configured for using multiple displays 21. In other embodiments, one or more of the display devices 21 may be provided by one or more other computing devices, such as computing devices connected to a remote computing device via a network.

In further embodiments, an I/O device 13 may be a bridge between the system bus 5 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

Computing environment may operate under the control of operating systems, such as OS 17, which may control scheduling of tasks and access to system resources. The computing device may be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any video gaming operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, Windows 7, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device having the computing environment 50 may have any different combination of processors, operating systems, and input devices consistent with the device's purpose and structure. For example, in one embodiment the computing device includes a Treo 180, 270, 1060, 600 or 650 smart phone manufactured by Palm, Inc. In this embodiment, the Treo smart phone may be operated under the control of the PalmOS operating system and includes a stylus input device as well as a five-way navigator device. In another example, the computing device includes a Wii video game console released by Nintendo Co. operating an es operating system. In this embodiment, the I/O devices may include a video camera or an infrared camera for recording or tracking movements of a player or a participant of a Wii video game. Other I/O devices 13 may include a joystick, a keyboard or an RF wireless remote control device.

Similarly, the computing environment 50 may be tailored to any workstation, desktop computer, laptop or notebook computer, server, handheld computer, mobile telephone, gaming device, any other computer or computing product, or other type and form of computing or telecommunications device that is capable of communication and that has sufficient processor power and memory capacity to perform the operations described herein.

Figure 2:
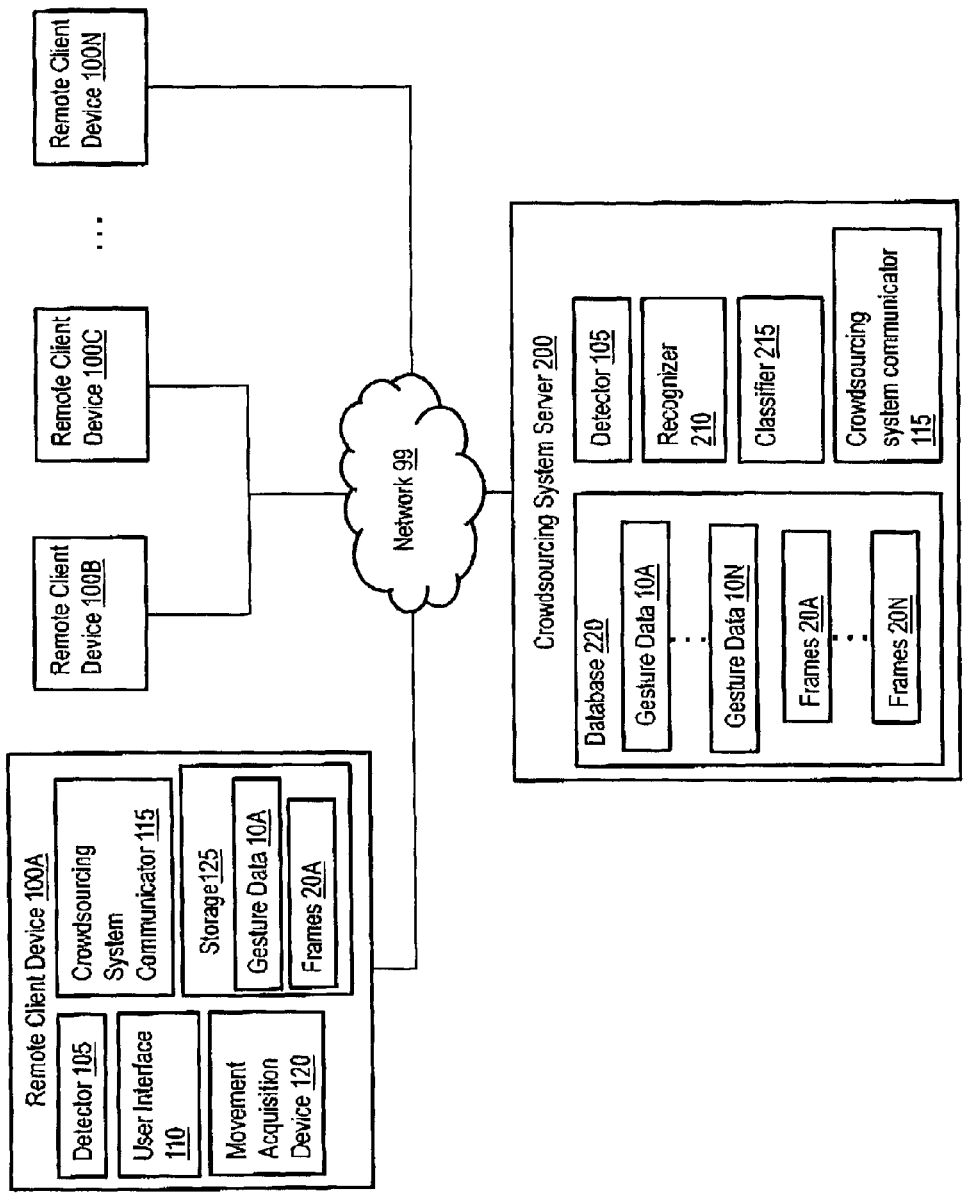
FIG. 2 illustrates a block diagram of an embodiment of a system for detecting movements of a subject using multidimensional gesture data.

Referring now to FIG. 2, an embodiment of a system for identifying a movement of a subject based on crowd sourcing data is displayed. FIG. 2A illustrates a remote client device 100A comprising a detector 105, a user interface 110, a crowdsourcing system communicator 115, a movement acquisition device 120 and a storage 125 which further comprises gesture data 10A and/or frames 20A. FIG. 2A also illustrates additional remote client devices 100B and devices 100C through 100N that communicate with a crowdsourcing system server 200 via network 99. Crowdsourcing system server 200 comprises a database 220 that includes gesture data 10A-N and frames 10A-N which are received from remote client devices 100A-N via the network 99. Crowdsourcing system server 200 further comprises a detector 105, a recognizer 210, a classifier 215 and a crowdsourcing system communicator 115.

In a brief overview, crowdsourcing system server 200 receives from a plurality of remote client devices 100A-N gesture data 10 and/or frames 20 which the remote client devices 100A-N collected via their own detectors 105, such as the video cameras. The gesture data 10 organized into frames 20 may include information identifying movements of body parts of persons performing specific actions or body motions. Gesture data 10 organized into frames 20 may include specific positions of certain body parts of a person (e.g. a shoulder, chest, knee, finger tips, palm, ankle, head, etc.) with respect to a particular reference point (e.g. a waist of the person depicted). Frames 20 may include collections of gesture data 10 points describing a location of a plurality of particular body parts with respect to the reference point. Classifier 215 on the server 200 may use gesture data 10 of the one or more frames 20 to process and "learn" to detect the particular body movement. Classifier 215 may assign each particular frame to a particular body movement for future detection and recognition. As the frames 20 may include a series of gesture data 10 identifying positions of each of the body parts of a person at a particular time point, the collection of frames may thus include and describe the entire movement of the subject. Each of the gesture data 10 points may be used by the system will learn to classify and identify the body movement. Upon processing by a classifier 215, once the same or similar movement is detected by a detector 105 in the future, a recognizer 210 may identify the given movement of the person using the classified frames 20 associated with this particular movement. As the database 220 of the crowdsourcing system server 200 is populated with frames 20 that include gesture data 10 gathered from various remote client devices 100A-N, the classifier 215 may classify and distinguish between an increasing number of body movements. As the result, with each additional data the classifier 215 processes and classifies, the system's capacity to recognize additional movements grows. Using crowdsourcing data from a large number of remote clients 100 may therefore quickly provide the system with the necessary gesture data 10 and frames 20 to quickly and efficiently populate the database 220 with valid data to be used for detection and prediction of body movements of various subjects in the future.

In a greater detail and still referring to FIG. 2, network 99 may comprise any type and form of medium through which communication between the devices 100 and system server 200 may occur. The network 99 may a local-area network (LAN), such as a company Intranet, a metropolitan area network (MAN), or a wide area network (WAN), such as the Internet or the World Wide Web. In one embodiment, network 99 is a private network. In another embodiment, network 99 is a public network. Network 99 may refer to a single network or a plurality of networks. For example, network 99 may include a LAN, a WAN and another LAN network. Network 99 may include any number of networks, virtual private networks or public networks in any configuration. Network 99 include a private network and a public network interfacing each other. In another embodiment, network 99 may include a plurality of public and private networks through which information traverses en route between devices 100 and server 200. In some embodiments, devices 100 may be located inside a LAN in a secured home network or an internal corporate enterprise network and communicating via a WAN connection over the network 99 to the server 200 located at a corporate data center.

Network 99 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 99 may comprise a wireless link, such as an infrared channel or satellite band. The topology of the network 99 may be a bus, star, or ring network topology. The network 99 and network, topology may be of any such network or network topology as known to those ordinarily skilled in the art capable of supporting the operations described herein A remote client device 100, such as device 100A, 100B, 100C through 100N, includes any type and form of a computing device comprising the functionality of a computing environment 50. Remote client device 100 may comprise hardware, software or a combination of hardware and software for gathering data, processing data, storing data and transmitting and receiving data to and from the crowdsourcing system server 200. Remote client device 100 may comprise applications, functions or algorithms for gathering, structuring and/or processing data from a detector 105. Remote client device 100 may include a video game system, such as a Nintendo Wii, a Sony Playstation or a Microsoft Xbox. Remote client device 100 may comprise a laptop computer or a desktop computer. Remote client device 100 may comprise a smartphone or any other type and form of a mobile device or any other type and form of a device capable of implementing the functionality described herein and/or communicating via a network.

Remote client device 100 may include a detector 105, a user interface 110, a movement acquisition device 120, a crowdsourcing system communicator 115, a recognizer 210 and/or any other components or device described herein. Remote client device 100 and any component of the device 100 may comprise a computing environment 50 or any functionality of the computing environment 50 to implement the functionality described herein.

Detector 105 may comprise any hardware, software or a combination of hardware and software for detecting or recording information or data identifying, describing or depicting a movement of a person. Detector 105 may comprise any type and form of a device or a function for detecting visual data that may identify or describe a person, a position of a person or a movement of a person. Detector 105 may comprise a video camera or a camcorder. Detector 105 may be a streaming camera outputting a digital video stream to the remote client device 100A. Detector 105 may be an integral part of the device 100 or an independent device external to the device 100 and interfaced with the device 100 via a chord, a cable or a network 99. Detector 105 may also be internal to or external from the server 200. Detector 105 may comprise an infrared camera. Detector 105 may include a high definition or a high resolution digital camera or camcorder. Detector 105 may include a motion detector or an array of motion detectors. Detector 105 may include a microphone. Detector 105 may include any one or more of or any combination of: an acoustic sensor, an optical sensor, an infrared sensor, a video image sensor and/or processor, a magnetic sensor, a magnetometer, or any other type and form of detector or system which may be used to detect, record or identify a movement of a person.

Detectors 105 may include any functionality for recording movements of specific body parts with respect to a reference point, such as for example a waist of the subject being recorded. In some embodiments, a detector 105 includes the functionality for recording a distance or a position of a fingertip of a hand of a person with respect to a reference point. In some embodiments, detector 105 includes the functionality for recording a distance or a position of a shoulder of a person with respect to a reference point. In further embodiments, detector 105 includes the functionality for recording a distance or a position of a hip of a person with respect to a reference point. In certain embodiments, detector 105 includes the functionality for recording a distance or a position of an elbow of a person with respect to a reference point. In some embodiments, detector 105 includes the functionality for recording a distance or a position of a palm of a hand of a person with respect to a reference point. In further embodiments, detector 105 includes the functionality for recording a distance or a position of a knee of a person with respect to a reference point. In some embodiments, detector 105 includes the functionality for recording a distance or a position of a heel of a person with respect to a reference point. In certain embodiments, detector 105 includes the functionality for recording a distance or a position of a toe of a person with respect to a reference point. In some embodiments, detector 105 includes the functionality for recording a distance or a position of a head of a person with respect to a reference point. In some embodiments, detector 105 includes the functionality for recording a distance or a position of a neck of a person with respect to a reference point. In further embodiments, detector 105 includes the functionality for recording a distance or a position of a pelvis of a person with respect to a reference point. In certain embodiments, detector 105 includes the functionality for recording a distance or a position of a belly of a person with respect to a reference point.

The reference point may be any given portion or location of a subject being recorded. In some embodiments, the reference point with respect to which all the other body parts are identified or measured includes a frontal midsection of the person's waist. In some embodiments, the reference point is a backside midsection of the person's waist. The reference point may be the center point of the person's waist depending on the orientation of the person with respect to the detector 105. In other embodiments, the reference point may be a person's head or a person's chest or a person's belly button. The reference point may be any portion of the human body referred to herein. Depending on the design, the reference point may be chosen to be any part or portion of a human body picked such that this location minimizes the errors in detection of the distance or relation of the position of some body parts to the reference point.

User interface 110 may comprise any type and form of interface between the user of the remote client device 110 and the device 100 itself. In some embodiments, user interface 110 includes a mouse and/or a keyboard. User interface may comprise a display monitor or a touchscreen for displaying information to the user and for enabling the user interaction with the device. In further embodiments, user interface 110 includes a joystick. In certain embodiments, user interface 110 includes a game tailored video game tool that allows the user to control data inputs to the video game or participate in the video game. User interface 110 may include functionality for the user to control the functionality of the remote client device 100. User interface 110 may comprise the functionality for controlling the gesture data 10 or data frame 20 acquisition and/or storage. User interface 110 may include the controls for the user to initiate the process of recording movements of the users via the detector 105.

Movement acquisition device 120 may comprise any hardware, software or a combination of hardware and software for acquiring movement data. Movement acquisition device 120 may comprise the functionality, drivers and/or algorithms for interfacing with a detector 105 and for processing the output data gathered from the detector 105. Movement acquisition device 120 may include the functionality and structure for receiving data from any type and form of detectors 105. For example, a movement acquisition device 120 may include the functionality for receiving and processing the video stream from a detector 105. Movement acquisition device 120 may include the functionality for processing the output data to identify any gesture data 10 within the output data. Movement acquisition device 120 may be interfaced with a detector 105, may be integrated into the detector 105 or may be interfaced with or comprised by any of the remote client device 100 or the crowdsourcing system server 200. Movement acquisition device 120 may be integrated with or comprised by any of the classifier 215 or recognizer 210.

Movement acquisition device 120 may comprise any functionality for extrapolating the gesture data 10 from the video data stream output and for forming frames 20. Movement acquisition device 120 may use gesture data 10 extrapolated from a particular image of a digital camera or a digital video camera and form or create a frame 20 comprising a collection of gesture data 10. In some embodiments, movement acquisition device 120 receives a video of a movement of a person and from the received data extracts the gesture data 10. Further, movement acquisition device 120 extracts from the received data one or more frames 20 depicting or identifying the particular body movement. Movement acquisition device 120 may comprise the functionality for storing the gesture data 10 and/or frames 20 into the storage 125 or into the database 220. As the movement acquisition device 120 may exist on the remote client device 100 or the server 200, the gesture data 10 and/or frames 20 extrapolated or created by the movement acquisition device 120 may be transmitted over the network 99 to and from the clients 100 and the server 200.

Crowdsourcing system communicator 115 may comprise any hardware, software or a combination of hardware and software for enabling and/or implementing the communication between the remote client device 110 and the crowdsourcing system server 200. Crowdsourcing system communicator 15 may include a network interface 25 and/or any functionality of a network interface 25. Crowdsourcing system communicator 115 may comprise functionality to establish connections and/or sessions for communication between the devices 110 and server 200. Crowdsourcing system communicator 115 may include the functionality to utilize a security protocol for transmitting protected information. Crowdsourcing system communicators 115 may establish network connections between devices 100 and the server 200 and exchange the gesture data 10 and/or frames 20 over the established connections. Crowdsourcing system communicator 115 may include the functionality for transmitting detector 105 data, such as the video stream data or detector output data across the network 99. Crowdsourcing system communicator 115 may include any functionality to enable the functions and processes described herein to perform the functions described.

In addition to the aforementioned features, storage 125 may include any hardware, software or a combination of hardware and software for storing, writing, reading and/or modifying gesture data 10 and/or frames 20. Storage 125 may comprise any functionality for sorting and/or processing gesture data 10 and frames 20. Storage 125 may comprise the functionality for interacting with a movement acquisition device 120, a recognizer 210 and/or a classifier 215 to allow each of these components to process the data stored in the storage 125.

Gesture data 10 may be any type and form of data or information identifying or describing one or more features of a movement of person. One or more features of a movement of a person may include a position or a location of a human body or a portion of a human body. The features of the movement, such as the position or location of a particular body part may be expressed in terms of coordinates. The features of the movement may also be expressed with respect to particular specific reference point. For example, gesture data 10 may describe or identify a position or a location of a particular body part of a subject with respect to a reference point, wherein the reference point may be a specific body part of the same subject. In some embodiments, gesture data 10 comprises data or information identifying or describing a movement of a human body or a portion of a human body. Gesture data 10 may comprise information about a location of a particular point of a human body with respect to a reference point. In some embodiments, gesture data 10 identifies a distance between a particular point of the human body and a reference point, the reference point being a point on the body of the subject recorded. Gesture data 10 may comprise any one of or any combination of scalar numbers, vectors, functions describing positions in X, Y and/or Z coordinates or polar coordinates. Detector 105 may record or detect frames identifying self-referenced gesture data in any number of dimensions. In some embodiments, gesture data is represented in a frame in a two dimensional format. In some embodiments, gesture data is represented in a three dimensional format. In some instances, gesture data includes vectors in x and y coordinate system. In other embodiments, gesture data includes vectors in x, y and z coordinate system. Gesture data may be represented in polar coordinates or spherical coordinates or any other type and form of mathematical representation. Gesture data may be represented as a distance between a reference point and each particular feature represented in the frame in terms of sets of vectors or distances represented in terms of any combination of x, y and/or z coordinates. Gesture data 10 may be normalized such that each gesture data 10 point is ranged between 0 and 1.

Gesture data 10 may include a function that describes a location or a position of a particular point of the human body with respect to a waist of the same human body. For example, gesture data 10 may include information identifying a location or a distance between a fingertip of a hand of a person and a reference point. In some embodiments, gesture data 10 includes information identifying a location or a distance between a hip of a person and a reference point. In certain embodiments, gesture data 10 includes information identifying a location or a distance between an elbow of a person and a reference point. In some embodiments, gesture data 10 includes information identifying a location or a distance between a palm of a person and a reference point. In further embodiments, gesture data 10 includes information identifying a location or a distance between a finger of a person and a reference point. In some embodiments, gesture data 10 includes information identifying a location or a distance between a knee of a person and a reference point. In some embodiments, gesture data 10 includes information identifying a location or a distance between a heel of a person and a reference point. In certain embodiments, gesture data 10 includes information identifying a location or a distance between a toe of a person and a reference point. In some embodiments, gesture data 10 includes information identifying a location or a distance between a head of a person and a reference point. In further embodiments, gesture data 10 includes information identifying a location or a distance between a neck of a person and a reference point. In some embodiments, gesture data 10 includes information identifying a location or a distance between a pelvis of a person and a reference point. In certain embodiments, gesture data 10 includes information identifying a location or a distance between a belly of a person and a reference point.

A frame 20 may comprise any collection or compilation of one or more gesture data 10 points from a single image, single digital video frame or from data detected or collected by the detector 105 in a single instance. Frame 20 may comprise a file containing numbers and values that identify the gesture data 10 values. A frame 20 may include a compilation of information identifying one or more locations of body parts of the subject with respect to a reference point. A frame 20 may include a location or a distance between a head of a person and a reference point and the information identifying a location or a distance between a heel of the person and the same reference point. Frame 20 may include any number of entries and any combination of entries of any one of or combination of parts of human body measured, identified or detected with respect to the reference point. In some embodiments, a single frame 20 includes data about each of: a shoulder, a left hip, a right hip, a left elbow, a right elbow, a left palm, a right palm, fingers on the left hand, fingers on the right hand, a left knee, a right knee, a left heel, a right heel, a left toe, a right toe, the head, the neck, the pelvis and the belly. Any combination of or compilation of these data points may be described in terms of their distance or reference from the same reference point. In some embodiments, the reference point is the waist of the person. In further embodiments, the reference point is the center frontal waist point. In other embodiments, the reference point is the rear frontal waist point. However, the reference point may also be any other part of the human body, depending on the system design. The frame 20 may therefore include any number of separate gesture data 10 points. In some embodiments, only a left heel, the head and the right knee may be used for a frame 20 to describe a particular movement of a person, whereas in a separate embodiment a right shoulder, a left hip, the right heel and the left toe may be sufficient to accurately describe another movement of the human body. Depending on the decisions made by the classifier 215, frames 20 for identifying different movements may include different gesture data 10 points. Similarly, for some movements only a single frame 20 may be sufficient, while for other movements two or more frames 20 may be used to classify or identify the movement.

Classifier 215 may comprise any algorithms, programs, logic circuits or functions for learning or differentiating some movements of the human body from other movements of the human body based on the gesture data I/O and/or frames 20. Classifier 215 may comprise the functionality for receiving output data from a detector 105 and extrapolate relevant information for identifying a movement. For example, classifier 215 may comprise the means to extrapolate gesture data 10 and/or frames 20 in a manner in which they can be used to be analyzed and compared with other gesture data 10 and frames 20. Classifier 215 may include hardware, software or a combination of hardware and software for analyzing and classifying gesture data 10 and/or frames 20. Classifier may include movement acquisition device 120 or any embodiment of the movement acquisition device 120. Classifier 215 may comprise the functionality to analyze, study and interpret information in the gesture data 10 and differentiate between the information in a gesture data 10 point involving a first body movement from the information in the gesture data 10 point involving a second body movement. Classifier 215 may comprise the logic and/or functionality to identify differences between the gesture data 10 involving separate body movements. Classifier 215 may comprise the logic and/or functionality for differentiating or distinguishing between two separate body movements based on the differences in gesture data 10 in one frame 20 from the gesture data 10 in another frame 20.

Classifier 215 may develop, create and store instruction files or algorithms that can be used to distinguish a first body movement from a second body movement. The distinguishing may be accomplished later by a recognizer 210 based on the differences between gesture data 10 in one frame 20 corresponding to the first movement from the gesture data 10 in another frame 20 corresponding to the second movement. Classifier 215 may search through the frames 20 and/or gesture data 10 corresponding to a first movement and compare the frames 20 and/or gesture data 10 of the first movement with the frames 20 and/or gesture data of a second movement distinct from the first movement. Classifier 215 may identify specific; gesture data 10 with each of the frames 20 which are most relevant in differentiating between the first movement and the second movement. Classifier 215 may select the most relevant frames 20 of a particular movement for differentiating most accurately this particular movement from all the other frames 20 associated with other movements. The one or more frames 20 identifying a movement that classifier 215 identifies as the most suitable one or more frames 20 for identifying the given movement may be provided to the recognizer in association with the movement so that the recognizer 210 may use these one or more frames 20 for identifying the same movement in the future.

Recognizer 210 may comprise any hardware, software or a combination of hardware and software for identifying or differentiating a body movement of a person. Recognizer 210 may include algorithms, programs, logic circuits or functions for using the gesture data 10 and/or frames 20 classified or processed by the classifier 215 to identify a particular movement of the person. In some embodiments, recognizer 210 utilizes a file, a function or a logical unit created or developed by the classifier 215 to identify a particular movement from other movements. Recognizer 210 may include any functionality for receiving and reading incoming video stream data or any other type and form of output from a detector 105. Recognizer 210 may further include any functionality for analyzing and/or interpreting the incoming data from the detector 105 and identifying and extrapolating the gesture data 10 from the detector 105 output data. Recognizer 210 may further include any functionality for comparing the gesture data 10 or frame 20 from the data received from the detector 105 and identifying a movement of a person based on the comparison of the freshly received gesture data 10 from the detector and the gesture data 10 and/or frames 20 classified by the classifier 215 previously.

Recognizer 210 may include the functionality for interacting with detector 105 in a manner to receive the data from the detector 105, extrapolate any gesture data 10 and process the gesture data into frames 20, and compare the extrapolated gesture data 10 and/or frames 20 to gesture data and/or frames 20 stored in database 220. Frames 20 stored in the database 220 may include the gesture data 10 that was processed and analyzed by the classifier 215 previously. Frames 20 classified by the classifier 215 may be used by the recognizer 210 to recognize that the frame 20 extrapolated from the data from the detector 105 matches a stored frame 20 associated with a particular movement of a person.

Database 220 may comprise any type and form of database for sorting, organizing and storing gesture data 10 and/or frames 20. Database 220 may include a storage 125 and any functionality of a storage 125. Database 220 may further include any functions or algorithms for organizing or sorting the gesture data 10 into frames 20. Database 220 may further include the functionality for creating frames 20 from one or more gesture data 10 points for a particular movement. Database 220 may include the functionality for interacting with classifier 215, recognizer 215, detector 105 and crowdsourcing system communicator 115. Database 220 may include the functionality to share the data stored in the database 220 with the system server 220 or any remote client device 100, depending on the arrangement and configuration.

Figure 3:
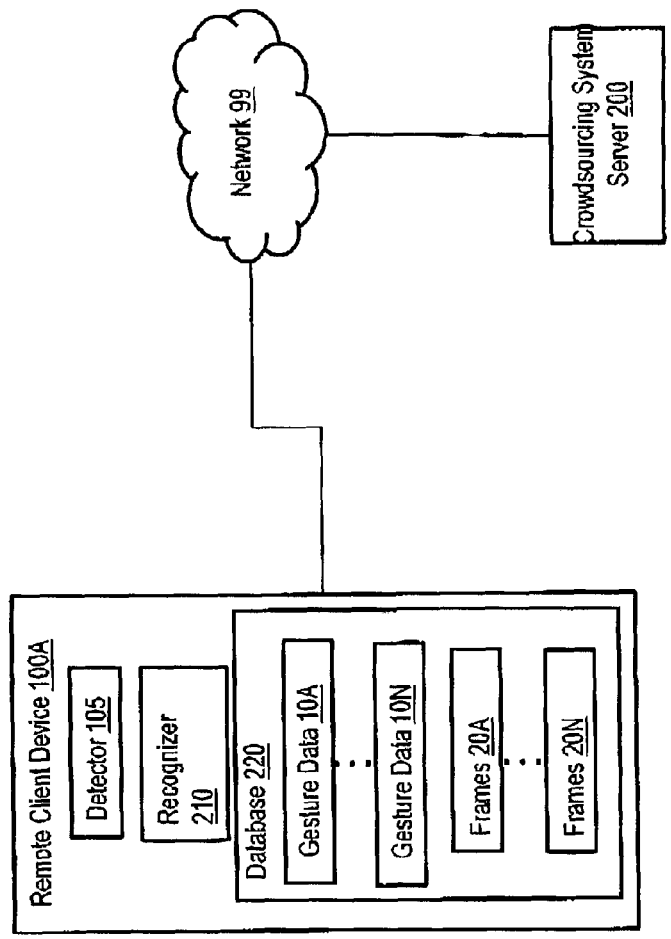
FIG. 3 illustrates a block diagram of another embodiment of a system for detecting movements of a subject using multidimensional gesture data.

Referring now to FIG. 3, another embodiment of a system for identifying a movement of a subject based on crowd sourcing data is displayed. FIG. 3 illustrates a system in which in addition to the components that remote client devices 100 may include in FIG. 2, a remote client device 100 may also include the recognizer 210 and database 220. In this embodiment, the remote client device 100A has the functionality to recognize and/or identify body movements recorded or detected via detector 105. For example, remote client 100 may use a detector 105, such as a digital camera for instance, to record a person moving. Recognizer 210 of the remote client device 100 may, alone or in cooperation with movement acquisition device 120, extrapolate one or more frames 20 that include gesture data 10. Recognizer 210 may then compare the extrapolated one or more frames 20 against frames 20 stored in, database 220. In embodiments in which remote client device 100 does not include the entire database 220, remote client device may transmit the extrapolated frame 20 over the network 99 to the server 200 to have the recognizer 210 at server 200 identify a match corresponding to a frame of database 220 corresponding to a particular movement. In other embodiments, database 220 of the client device 100 may be synchronized with database 220 of the server 200 to enable the client device 100 to identify movements of the subject recorded or detected via detector 105 independently and without the interaction with the server 200.

Figure 4:
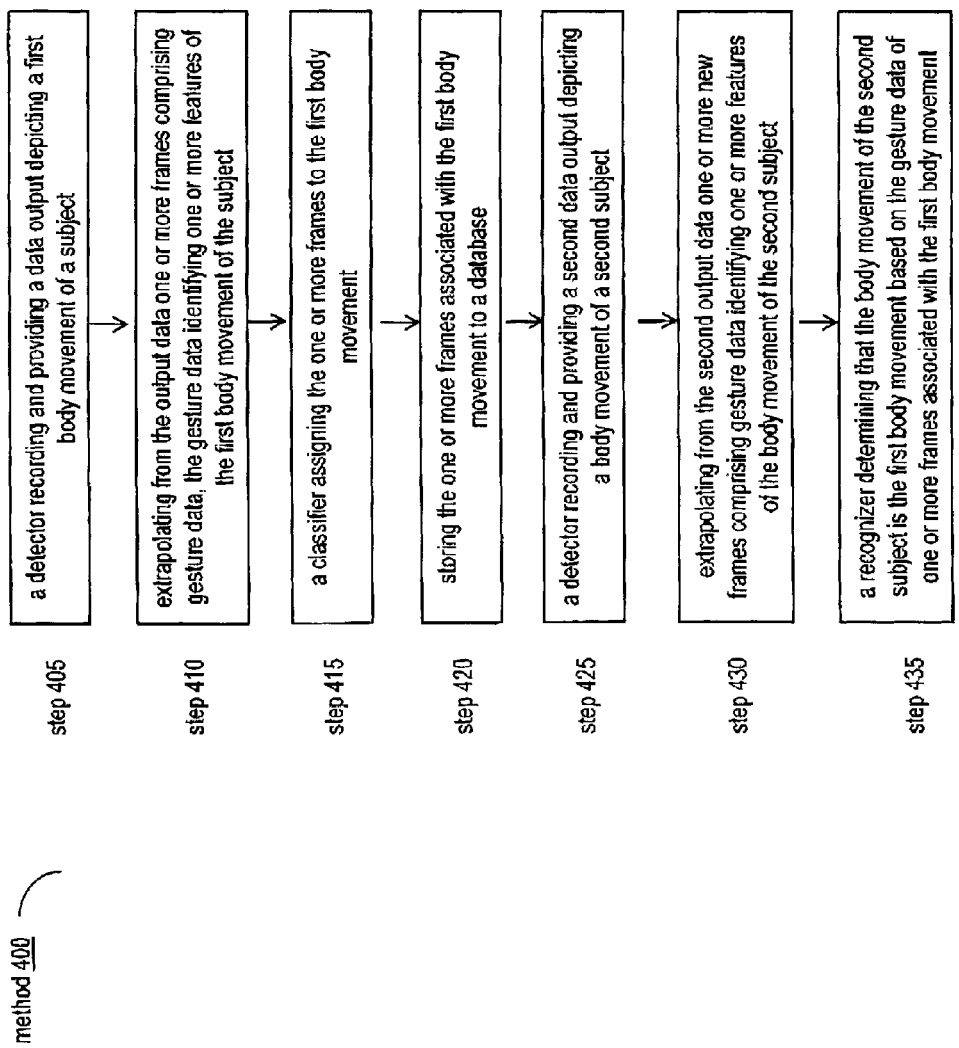
FIG. 4 illustrates a flow diagram outlining steps of a method of detecting movements of a subject using multidimensional gesture data.

Referring now to FIG. 4, an embodiment of a method of steps of identifying a movement of a subject based on data is illustrated. In brief overview, at step 405, a detector 105 records or provides a data output depicting a first body movement of a subject. At step 410, a component of the system extrapolates from the output data one or more frames comprising gesture data, the gesture data identifying one or more features of the first body movement of the subject. At step 415, a classifier of the system assigns the one or more frames to the first body movement. At step 420, one or more frames are stored with the first body movement to a database. At step 425, a detector records a second data output depicting a body movement of a second subject. At step 430, a component of the system extrapolates from the second output data one or more new frames comprising gesture data identifying one or more features of the body movement of the second subject. At step 435, a recognizer of the system determines that the body movement of the second subject is the first body movement based on the gesture data of one or more frames associated with the first body movement.

In further detail, at step 405 a detector 105 records a movement of a subject and provides a data output depicting or describing the first body movement of the subject. Detector 105 may be a detector 105 of any of the remote client devices 100 or the detector 105 of the server 200. In certain embodiments, client devices 100 transmit the data output from their detectors 105 to the server 200. A detector may comprise a digital video camera recording movements of a person in a series of digital images or digital frames. Detector may record and provide a digital video stream. In some embodiments, the detector records data that identifies movements of the person using coordinates and values. In further embodiments, the detector records positions of particular body points of the subject with respect to a reference point. The reference point may be a designated point on the subject's body. In some embodiments, the detector provides the raw images, such as for example digital images to the system. In other embodiments, the detector extrapolates the relevant gesture data from the images and provides the extrapolated gesture data from each frame to the system. Depending on the system design and preferences, the detector may provide the frames of digital images or frames of extrapolated gesture data to the system for further processing.

Detector 105 may be a camera, such as a Microsoft Kinect Camera which may record frames of self-referenced gesture data. Detector 105 may be a camera deployed on a football stadium, baseball stadium, soccer stadium, airport or any other crowded venue and may record the crowd passing by. Detector 105 may provide a stream, of frames that may include self-referential gesture data of one or more subjects recorded in the frames. Self-referential gesture data may include gesture data identifying locations or positions of various body parts of a subject in reference to a body point of the subject itself.

In some embodiments, the detector records or detects a person throwing a ball. In some embodiments, the detector records or detects a person walking. In some embodiments, the detector records or detects a person running. In some embodiments, the detector records or detects a person attempting to strike someone or something. In some embodiments, the detector records or detects a person pulling, carrying or lifting an object. In some embodiments, the detector records or detects a person walking with an unusually nervous demeanor. In further embodiments, the detector records or detects a person yelling. Detector may record any movement or action a person may do in any given situation and under any set of circumstances.

At step 410, one or more frames comprising gesture data describing the movement of the subject are extrapolated from the output data provided by the detector. Depending on the system design, any one of a detector 105, a movement acquisition device 120 or classifier 215 may perform this task. In some embodiments, Microsoft Kinect Camera records the subject and comprises the functionality, such as the movement acquisition device 120 functionality within itself, to extrapolate the gesture data from the frames. The gesture data from the extrapolated one or more frames may identify one or more features of the first body movement of the subject. In some embodiments, a feature of dm gesture data identifies a position or a location of a left and/or right shoulder of the subject. In further embodiments, the feature identifies a position or a location of a left and/or right hip of the subject. In further embodiments, the feature identifies a position or a location of a left and/or right elbow of the subject. In further embodiments, the feature identifies a position or a location of a left and/or right palm of the subject's hand. In further embodiments, the feature identities a position or a location of the fingers on the left and/or right hand of the subject. In some embodiments, the location may be one of the set of fingers, whereas in other embodiments a location of each of the fingers may be individually identified. In further embodiments, the feature identities a position or a location of a left and/or right knee of the subject. In further embodiments, the feature identifies a position or a location of a left and/or right heel of the subject. In further embodiments, the feature identifies a position or a location of the toes on left and/or right leg of the subject. In further embodiments, the feature identifies a position or a location of a head of the subject. In further embodiments, the feature identifies a position or a location of a neck of the subject. In further embodiments, the feature identifies a position or a location of the pelvis of the subject. In further embodiments, the feature identifies a position or a location of the belly of the subject. In further embodiments, the feature identifies a position or a location of the waist of the subject.

Each of the features of the gesture data 10 identified may be self-referenced, such as to identify the location or the position or the subject identified with respect to a particular reference point within the frame. In some embodiments, the features are identified with respect to the position or location of the waist of the person. In other embodiments, the features are identified with position or location of the left shoulder or the right shoulder of the person. In yet other embodiments, the features are identified with position or location of the left hip or the right hip of the person. In yet other embodiments, the features are identified with position or location of any of the left or right palms of the person. In yet other embodiments, the features are identified with position or location of any of the fingers of the person on either of the hands. In yet other embodiments, the features are identified with position or location of any of the knees of the person on either of the legs. In yet other embodiments, the features are identified with position or location of any of the heels of the person on either of the legs. In yet other embodiments, the features are identified with position or location of any of the toes of the person. In yet other embodiments, the features are identified with position or location of the head of the person. In yet other embodiments, the features are identified with position or location of the neck of the person. In yet other embodiments, the features are identified with position or location of the pelvis of the hips of the person. In yet other embodiments, the features are identified with position or location of the belly of the person. In still further embodiments, the features are identified with the position of the chest of the person.

Still in connection with step 415, extrapolation of the one or more frames may comprise storing, formatting or organizing gesture data 10 into frames 20. In some embodiments, frames 20 are created by compiling gesture data 10 into files. In further embodiments, extrapolation of the one or more frames includes creating frames 20 from each digital image frame, where the frame 20 comprises gesture data 10 collected from the digital image frame. In further embodiments, frame 20 includes a file of gesture data 10, wherein the gesture data 10 entries comprise numbers and values identifying the location of each of the given body parts with respect to a predetermined reference point.

At step 415, a classifier 215 processes the one or more frames and assigns the one or more frames to a particular body movement. The classifier 215 may use any learning functionality and/or algorithm described herein to process the one or more frames, learn the movement, identify the features of the gesture data of the frames corresponding to the movement that identify the movement from any other movements and assign the frames and/or gesture data to the distinguished movement. In some embodiments, the classifier determines that the one or more frames identifies a movement that was never identified before. The classifier may assign the one or more frames with the new movement, thereby adding this new movement to the database. In some embodiments, the classifier determines that the same or a substantially similar movement is already identified and stored in the database 220. If the classifier identifies that the same or similar movement is already represented, the classifier may modify the one or more frames stored with some gesture data from the new frames which may be more suitable and more accurately represent the movement. In some embodiments, classifiers assigns one or more assembled frames comprising gesture data that identifies the particular movement to the particular movement by associating the one or more frames with the movement in the database.

At step 420, the database 220 stores the one or more frames associated with the particular body movement in association with the particular body movement. In some embodiments, database 220 marks the one or more frames to identify the particular body movement. In some embodiments, database 220 sorts the frames 20 stored in accordance with the movements they identify. In further embodiments, database 220 comprises a set of name-value pairs, wherein the frames are assigned particular values corresponding to the particular movement. In further embodiments, the database stores a single frame in association with the particular movement. In yet further embodiments, the database stores two, three, four, five, six, seven, eight, nine or ten frames in association with the particular movement. In yet further embodiments, the database stores any number of frames in association with the particular movement, such as for example hundreds of frames. In still further embodiments, database 220 may store one or more frames that are modified by the classifier in view of the new gesture data the classifier determines that should be included in the existing stored frames associated with the particular movement.

At step 425, a detector records and provides a second data output depicting a body movement of a second subject. In some embodiments, the detector is a detector of a remote client 100. In other embodiments, the detector is a detector of the server 200. A detector may comprise a digital video camera recording movements of a person in a series of digital images or digital frames. Detector may record and provide a digital video stream. In some embodiments, the detector provides the data output to a recognizer 210. In other embodiments, the detector provides the data output to a movement acquisition device 120. Detector may record or detect any movement such as the movements described at step 405.

At step 430, one or more new frames from the second output data comprising the new gesture data identifying a movement of a second subject are extrapolated from the second output data. In addition to all the steps performed at step 410, at step 430 any one of a movement acquisition device 120 or a recognizer 210 may perform the extrapolating. As with the embodiments described at step 410, the new gesture data from the extrapolated one or more new frames may identify one or more features of new body movement of the second subject. The new body movement of the second subject may include any one or more of the embodiments or features of the first movement at step 410. In some embodiments, the new movement is the same as the first movement. In other instances, the new movement is a different movement from the first movement at step 410. As with the features of the gesture data at step 410, the new gesture data may identify the locations or positions of any of the person's shoulders, hips, elbows, palms, fingers, knees, heels, toes, head, neck, pelvis, belly, chest and/or waist. Also as with the gesture data at step 410, the new gesture data of the new one or more frames may be identified with respect to a reference point, such as any of the person's shoulders, hips, elbows, palms, fingers, knees, heels, toes, head, neck, pelvis, belly, chest and/or waist. The new one or more frames may be extrapolated from one or more digital images or digital frames of a digital video camera recording the movement.

At step 435, a recognizer of the system determines that the body movement of the second subject is the particular first body movement previously classified by the classifier 215 at step 415 and stored in the database at step 420. In some embodiments, the recognizer determines that the body movement of the second subject is the same or substantially similar to the first body movement. In further embodiments, the recognizer makes the determination based on determining that the gesture data from one or more new frames of the second movement is the same or substantially similar to the gesture data of the first movement stored in the database. In some embodiments, the recognizer determines that one or more of the features of the new gesture data of the one or more new frames matches the one or more features of the gesture data of the first movement stored in the database to within a particular threshold. In some embodiments, the features of the new gesture data matches the features of the gesture data of the stored first body movement to within the threshold of plus or minus a particular percentage of the values identifying the feature. For example, the features of the new gesture data may match the features of the gesture data stored in the database to within any error range of between 0 and 99%. For example, the feature of the new gesture data may match the features of the gesture data stored in the database to within 0.1%, 0.2%, 0.5%, 0.8%, 1%, 1.5%, 2%, 2.5%, 4%, 5%, 6%, 7%, 8%, 9%, 1.0%, 12%, 14%, 16%, 20%, 25%, 30%, 40% or 50%. In some embodiments, the threshold to within which the match is identified is the same for all features of the gesture data. In other embodiments, the threshold to within which the match is identified is different for different features of the gesture data.

Still in connection with step 435, in one example, a match between the new one or more frames of the second subject's movement and the one or more frames stored in the database is identified based on the determining that between the two sets of frames, the locations of the fingers, heels, knees and elbows matches within 2.5%. In another example, a match between the new one or more frames of the second subject's movement and the one or inure frames stored in the database is identified based on determining that between two sets of frames, the locations of the head, hips and heels match within 1% and palms, elbows and knees are matching within 3.8%. In some embodiments, in response to determining that a match between the gesture data of the two one or more frames is found, the recognizer determines that the body movement of the second subject is the first body. The recognizer thereby recognizes the movement of the second subject based on the data stored in the database.

B. Further Embodiments of the Systems and Methods

In some aspects, the present disclosure is to a set of particular detailed embodiments that may be combined with any other aforementioned embodiments to create the systems and methods disclosed herein. In one aspect, the disclosure addresses a set of experiments that are grounded around the realistic limitation of global bandwidth, complexity and diverseness of the mannerisms of the human gesture condition. The proposed research may be using components, such as the Microsoft Kinect camera developed by PrimeSense. In some aspects of testing, 20 complex gestures may be trained, programmed to the system and recognized by the system at a mean of 98.58% based on 607220 samples.

Gestures may be viewed as an important aspect of body language and may be used every day in communications between people. For many people, it may be difficult to avoid making some kind of gesture when communicating face to face with another person. Gestures can convey messages easily and seemingly wordlessly. Being able to consistently and rapidly assess and perform gestures may form the basis of many forms of entertainment, including games that can be either cooperative or competitive in nature. Gestures can represent a variety of different things, from abstract ideas and emotions to representations of more concrete things such as intentions, people, places or things. Finding a way to differentiate between these forms of communication accurately using a detection based system has been rather difficult in the past.

Machines may have the potential to successfully classify a gesture quicker and more efficiently than a human being through a process, such as a machine learning. In the process such as the machine learning, a machine is taught a way to recognize gestures. The potential for machine-based intelligence to categorize and detect different types of gestures may be used to expand the worlds of electronic communication, interactive entertainment, and security systems.

What actually may define a gesture, and what that gesture may mean may be very subjective. Gestures may include any sequence of movements of a human body as well as physical configurations or positions of the human body at a particular time. In some instances, gestures include a particular position of a to body at a particular instant or a specific point in time. Multitude of such particular positions through time may make up a sequence of movements. Specifically, the orientation or position of one or more body parts of a human body at a particular time as well as the movement of certain body parts or joints—of the human body through time may define a gesture.

From retrieved data about the positioning and movement of the joints during gestures acted out by people, it is possible to use artificially intelligent means to learn from this information to predict consecutive frames of a gesture and interpret what future gestures could possibly represent. The idea that the process of gesture recognition can be performed by machines not only offers the convenience of automation and speed, but also opens up the potential for artificial systems to participate in gesture-based communication and entertainment. Towards this goal, some form of artificial intelligence is required to know about what categories of gestures exist and go about predicting them from contextual (e.g. visual) cues observed from human performers.

Being able to quickly and concisely interpret and perform gestures in many cases can be made into a social and co-operative (or competitive) game. In one such game, players engage in a gesture-based game by either attempting to perform gestures or recognizing which gestures are being performed by others; attempting to maximize their accuracy in both tasks. From collected information about the position and orientation of joints during gestures performed by humans, it is possible to employ artificial intelligent systems to learn from this data and make predictions about future, unseen joint information and the type of gesture that it most likely represents. Using such games in which multitude of players act out different body movements, gesture data may be generated and transmitted to the back end crowdsourcing server to be processed by classifiers and to be used for quick and efficient population and refinement of the database of gesture movements.

In the present embodiment, we particularly focus on tests and experiments regarding machine-learning algorithms that involve classification.

The original research problem was to begin the testing of a dynamic gesture recognition system that could understand complex hand gestures. Originally for our goal, many technical hurdles presented themselves: 1) Choose an approach for the segmentation of hand gestures. 2) Come up with a descriptor to pass on the segmented data effectively to an intelligent system for classification. 3) Once classified, a recognition system, whether real-time or beyond real-time, needs to shows signs of measurable recognition by way of an intelligent system.

One of the challenges in this research has been that comparing results with that of other researchers in the field is very difficult due to the unrepeatability of similar test conditions, arising from the diversity in acquisitioning hardware and environmental conditions. Enter Microsoft Kinect Camera that is currently the fastest selling consumer electronics device and boasts an RGB camera, IR depth camera, and onboard segmentation. This camera may be an embodiment of our detector.

We may build gesture prediction models based on several different classification algorithms. This process may begin first with gathering examples of gestures for the purposes of training each classifier. This data set may be referred to as training data, and may include gesture data in the form of joints as captured and recorded by a specialized stereoscopic camera (the Kinect device). This data may then be aggregated and transformed for optimal classification, before the classifier model is built and finally tested on a subset of the data collected.

Figure 5:
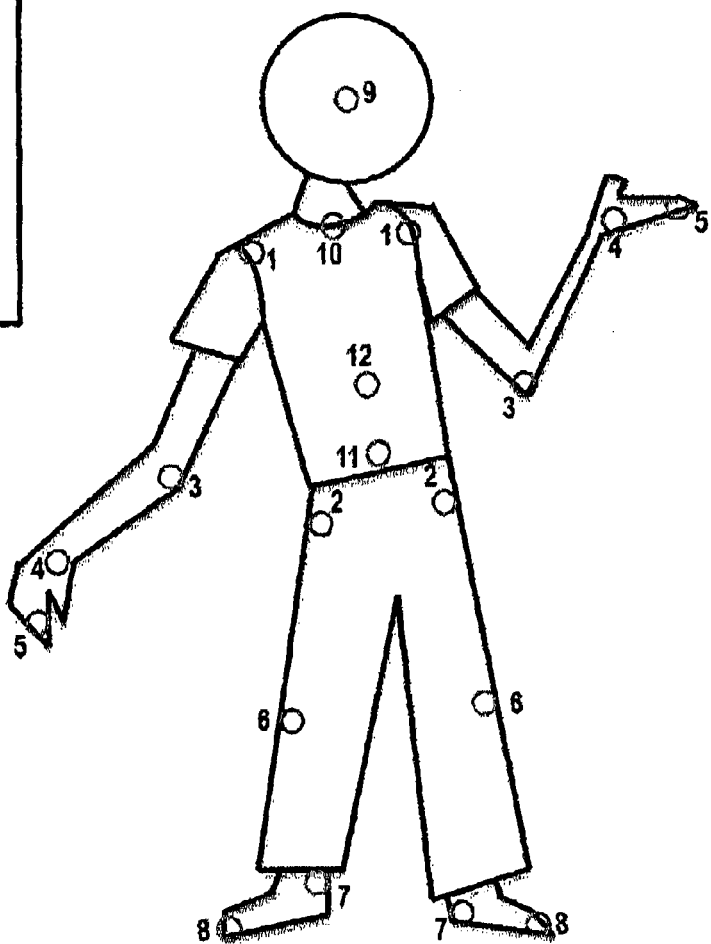
FIG. 5 illustrates an embodiment of a subject along with feature points referring to locations on the subject's body that are identified by the gesture data.

Referring now to FIG. 5, an illustration of a subject or a user with two arms, two legs and a head is illustrated. FIG. 5 comprises circles of body points which are to be tracked or monitored. For the purpose of our experimentation, a Microsoft Kinect SDK Beta1, 1.1 and 1.2 may be used in an XNA 4.0 environment. The original skeleton algorithm may be used as a starting point. The data presented later may not be conditional on the Kinect hardware; all algorithms described may be applicable to any camera or any other type and form of a detector. The camera may include a segmentation algorithm that approximates a skeleton within a body (human or animal), be it the whole body, or something more detailed, like the hands. In some embodiments, such capability may be removed from the camera and be included in other components of the system described earlier.

In one embodiment, presented is a hierarchical 3D shape skeleton modeling technique which is very promising for learning skeletons of many 3D objects, including people, hands, horses, octopoda and planes. Being piecewise geodesic, the segment borders are smooth and non-twisting." A similar outcome may be achieved in a different embodiment in which the method is based on a curved skeleton representing the object's interior, which produces both a surface segmentation and a corresponding volumetric segmentation. FIG. 5 illustrates an approximation of the body shape of a single user. The Kinect camera may be designed to segment a user like this without the need for any type of calibration gesture.

The approach used in another embodiment may use the process as pose recognition, which may utilize only a single frame depth image. The technique of such an embodiment may be as follows: First, a deep randomized decision forest classifier is trained to avoid over-fitting by using hundreds of thousands of training images. Second, discriminative depth comparison image features yield the 3D translation invariance. Third, spatial modes of the inferred per-pixel distributions are computed using mean shift. The outcome is the 3D joint points. The mean shift is for feature space analysis, based on a multivariate kernel density estimator.

The stock Kinect camera may natively sample at 30 fps but can be modified to operate at 60 fps or any other rate. In one embodiment, the full segmentation can operate at 200 fps. In a further embodiment, a technique may be used to recognize gesture data at up to 600 fps. In further embodiments, an approach may be used which prioritizes accuracy of complex gestures, speed of recognition, and compression requirements. The supplemental data may begin with the assignment of 15 varied base characters, though this technique may add associations. In a further embodiment, our starting point may be first to sample in an invariant approach by beginning with, a simple constant, the waist. All joints of the subject may be calculated as special references from this point. The position of each joint may be normalized to minimize variance in a user's size and/or reduce error.

In some embodiments when attempting to recognize complex gestures, descriptors, including motion descriptors, and shape descriptors like Extended Gaussian Images, Shape Histograms, D2 Shape Distributions, and Harmonies may be used. In one embodiment, a harmonic shape descriptor starting from the center mass may be used. In other embodiments, an elevation descriptor by taking the difference between the altitude sums of two successive concentric circles of a 3D shape may be used.

Figure 6A:
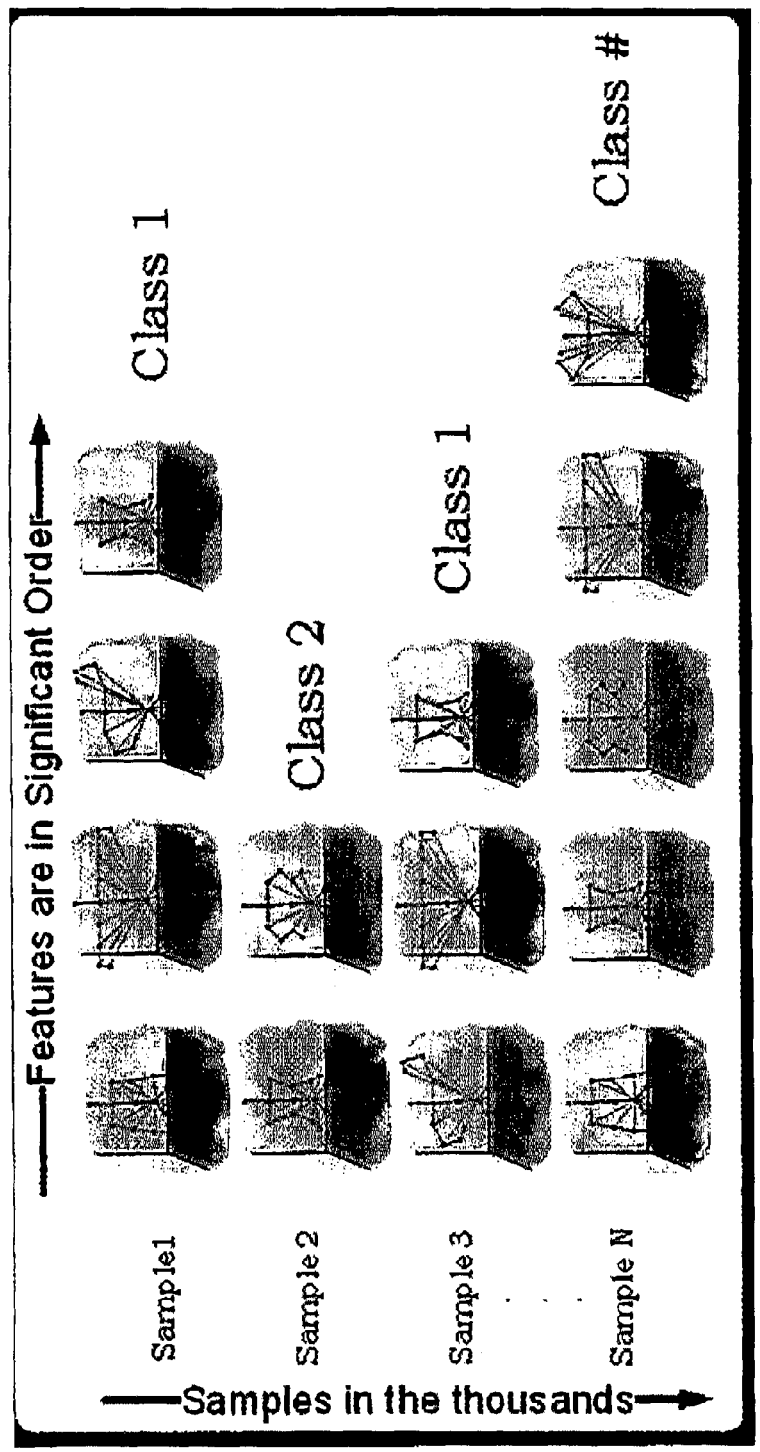
FIGS. 6A, 6B and 6C illustrate examples of classes and illustrations of various data points included in a frame.
Figure 6B:
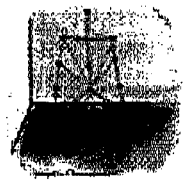
Figure 6B:
Figure 6C:
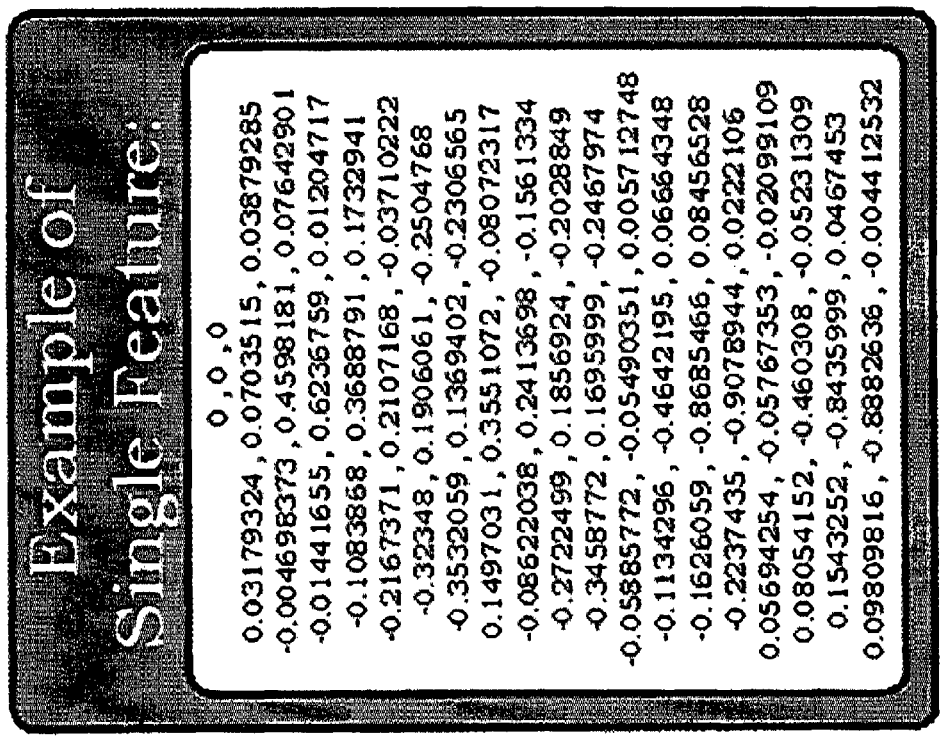

Referring now to FIGS. 6A, 6B and 6C, an embodiment of a system and system data is illustrated. In brief overview, FIG. 6A illustrates locations of body components with respect to a reference point for various different classes of movements. FIG. 6B illustrates a representation in 3D space corresponding to the embodiments illustrated in FIG. 6A. FIG. 6C illustrates data points of gesture data for various points of the human body in 3D.

A free public database that includes enough diversity between full body gestures or hand gestures that include pre-segmented data may not initially be available and may need to be built and populated with gesture data. Creation of a custom full body gesture database may be needed to carry on the research. A virtual version of the game Charades may be used to collect gesture data. Data may be collected via network 99 from hundreds or thousands of players operating devices 100 and playing this game worldwide. For the purposes of an experiment, a set of twenty gestures are selected mostly randomly out of a classic commercial version of Charades. The game may be formatted in a way that the length of a gesture is trimmed by way of supervised learning, meaning another user may be used to play the game. When the second user accurately guesses the gesture by vocally naming it (voice recognition was used), this signifies the end point of the gesture. Table 1, shown below alphabetically lists the 20 gestures used in the database for the purposes of testing the system. In some embodiments, it may the gestures may be open to interpretation. Of the 20 separate gestures (i.e. classes), for the purposes of the experiment, at least 50 full samples of each gesture may be sampled.

TABLE 1

Gesture data collected for training, testing, real-time recognition and prediction

| | | |
|---|---|---|
| Air Guitar | Crying | Laughing |
| Archery | Driving | Monkey |
| Baseball | Elephant | Skip Rope |
| Boxing | GESTURES | Sleeping |
| Celebration | Fishing | Swimming |
| Chicken | Football | Titanic |
| Clapping | Heart Attack | Zombie |

The Kinect detector may sample user "gesture" information from the IR depth camera. The data coming from the camera may be oriented relative to its distance from the Kinect. This orientation may become problematic when searching for the solution to universal truths in gestures. A normalization technique may be developed and used that converts all depth and position data into vectors relative to a single joint presumed most neutral. The waistline of a subject, such as the subject in FIG. 5, may be selected as the reference point.

Figure 7:
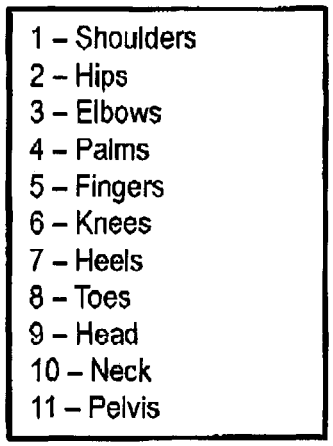
FIG. 7 illustrates an embodiment of a subject with gesture data illustrated in connection with a reference point on the subject's body.
Figure 7:
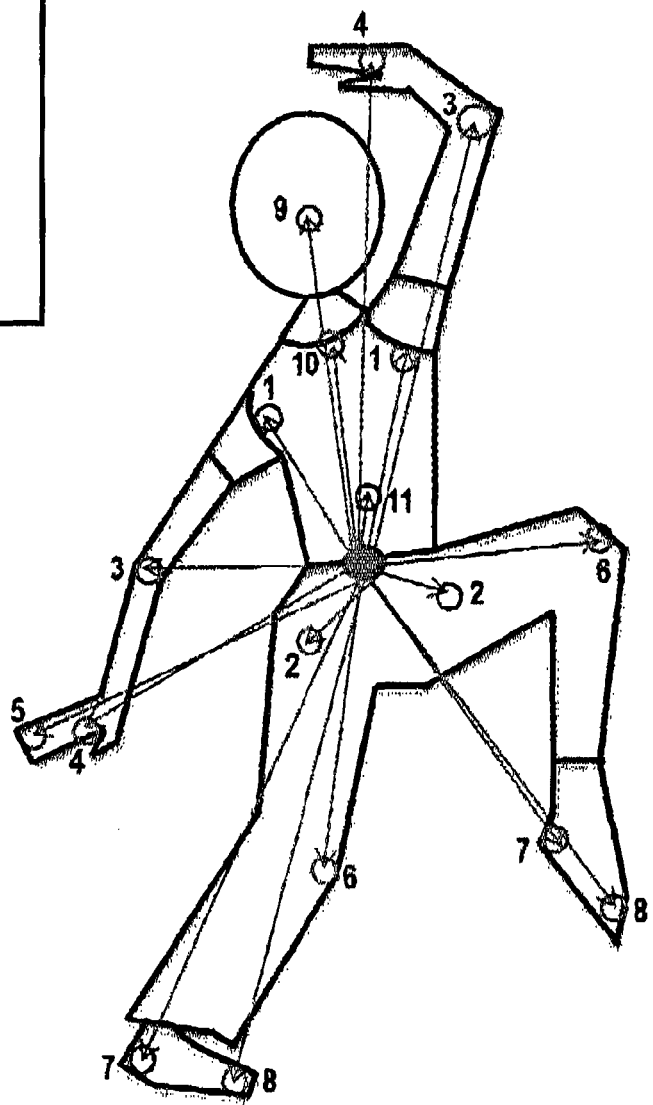

Referring now to FIG. 7, an illustration of a subject studied is illustrated. In brief overview, the subject's shoulders, hips, elbows, palms, fingers, knees, heels, toes, head, neck and pelvis are indicated with respect to the subject's waist. In this embodiment, the result includes positive and negative x, y, and z-axis values. Data scaling is later described and may be used to eliminate negative numbers. In some embodiments, data scaling is used to eliminate the negative numbers. Additionally, normalization is used to normalize all values to values between 0 and 1.

In some embodiments, the data needed to be sampled out of the Kinect is sampled through a middleware developed in-house. In some embodiments, a full gesture is made up of 1200 to 2000 frames. This may be viewed as oversampling. In some embodiments, an approach of eliminating redundant frames from the one or more frames (such as the 1200-2000 frames) is used in order to use a smaller number of frames. In some embodiments, it is safe to eliminate any redundant frames as the detector, such as the Kinect camera, data samples to the 8th decimal place on each joint. In such embodiments, it may be uncommon for the camera to sample two identical frames in a row as the circuit noise alone would prevent this from occurring. In some embodiments, the average temporal length of each gesture in the database is 200-300 frames.

Figure 8A:
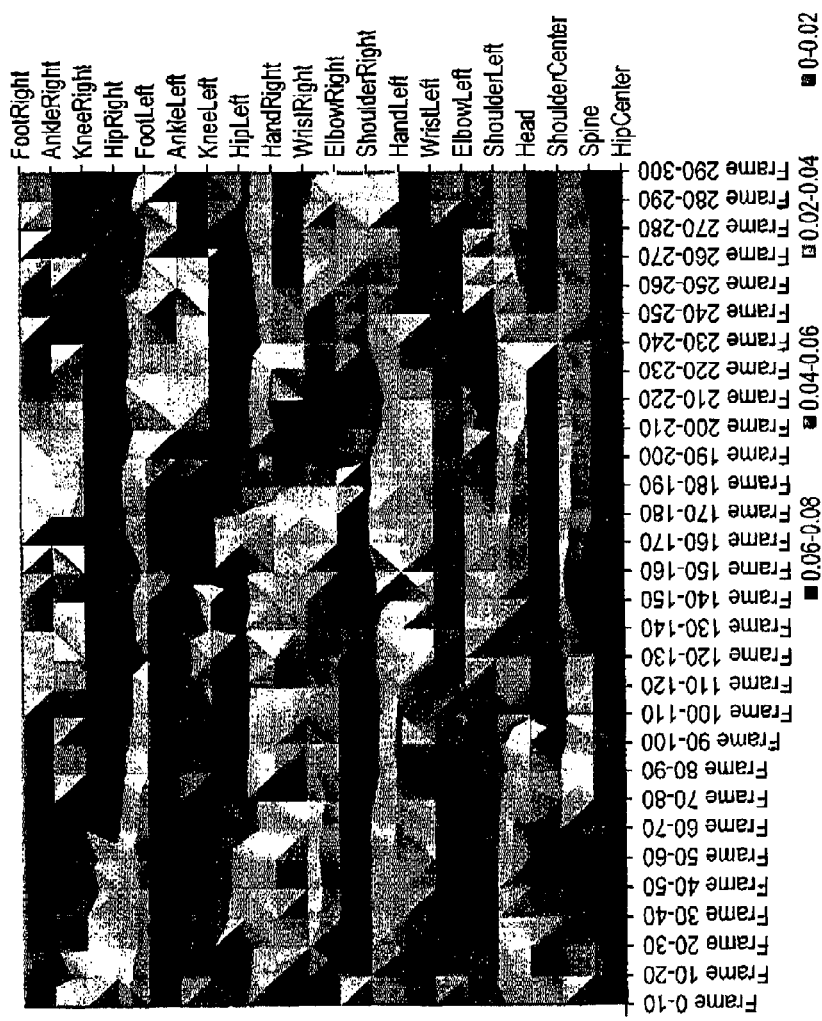
FIG. 8A illustrates an embodiment of a collection of frames in which gesture data identifies positions of the subject's body parts through a movement of frames in time.

Referring now to FIG. 8A, an embodiment of an overhead view of a 3D plot of a single gesture's set of frames is illustrated depicting the frames changing through time. FIG. 8A therefore depicts features of gesture data, including: a right foot, a right ankle, a right knee, a right hip, a left foot, a left ankle, a left knee, a left hip, a right hand, a right wrist, a right elbow, a right shoulder, a left hand, a left wrist, a left elbow, a left shoulder, the head, the center shoulder, the spine and the hip center of the person. FIG. 8A illustrates these gesture data points moving through approximately 300 frames. As shown in FIG. 8A data is illustrated as moving through frames 0 through 290, such as for example in frames 0-10, 20-30, 40-50, 60-70, 80-90, 100-110, 120-130, 140-150, 160-170, 180-190, 200-210, 220-230, 240-250, 260-270 and 280-290. FIG. 8A may refer to each one of the frames between 0-290 or selections of frames between 0-290, leaving some frames out.

Figure 8B:
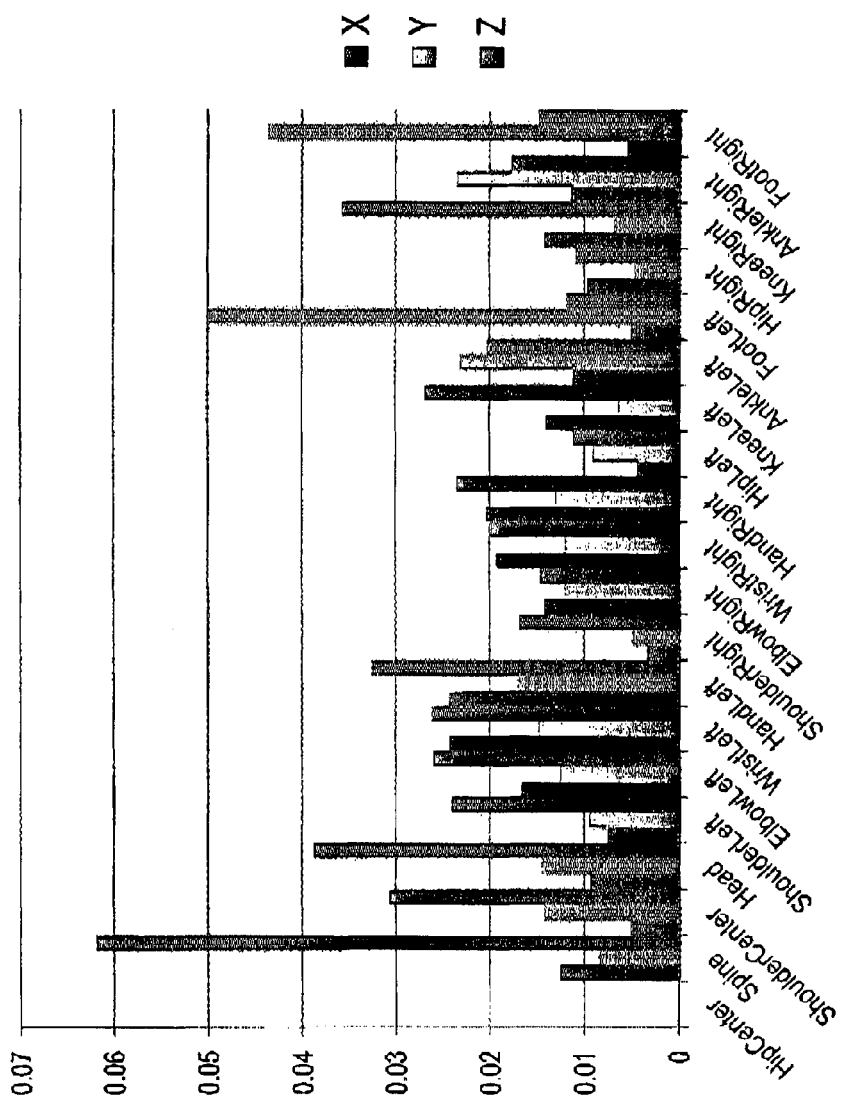
FIG. 8B illustrates an embodiment of a collection of gesture data points within a frame in which a subject is depicted in a particular position.

In reference to a dataset similar to the one depicted in FIG. 8A, for experimentation purposes, a matrix of size N rows and 60 columns of floating point numbers may be used as input. Output may include a column vector of integers denoting class ID. Each input column (each of the 60 features) may be scaled across all samples to lie in range. FIG. 8B illustrates a sealed plot of a series of frames depicting movements of the subject in FIG. 7 with normalized vectors. Data scaling may be applied to diversify the learning algorithm testing and improve gesture compression for transmission over the network. Data scaling of getting rid of negative values and/or normalizing values between 0-1 may enables the usage of a specialized compression technique for transmitting this particular type of data over the network 99, thereby enabling a more efficient communication and data exchange between the devices 100 and the server 200.

One of the equations that may be used for data scaling may be a normalization vector equation as follows:

$$\hat{u} = \frac{u}{\|u\|}$$

Learning and recognition may work in collaboration. Recognition systems may use several types of intelligent systems to recognize patterns between classes (in our case gesture classes). In one example, a Nintendo's Wii remote control may be used. The approach may involve using the handheld device's two 3D accelerometers to learn two different gestures moving through time (our experiments use 20 3D points.) In such an example, a Self-Organizing Map (SOM) may be used to divide the sample data into phases and a SVM to learn the transition conditions between nodes. In such an embodiment, the supervised system may score an accuracy of 100 percent for class one and 84 percent for class two. The unsupervised system may score an accuracy of 98 percent for class one and 80 percent for class two.

In another embodiment, the experiment may also involve the Wii but the gesture classes may be increased to 12 with 3360 samples. The user dependant experiments in such embodiments may score an accuracy of 99.38% for the 4 direction gestures and 95.21% for all the 12 gestures. The user independent version may score an accuracy of 98.93% for 4 gestures and 89.29% for 12 gestures.

In some embodiments, a gesture recognition approach for small samples sizes is used. For some experiments, a set of 900 image sequences of 9 gesture classes may be used. Each class may include 100 image sequences. In some embodiments, more classes and less complete samples may be utilized. A Scale-Invariant-Feature-Transform (SIFT) may be used as a descriptor while a scalar vector machine (SVM) may be used for the learning. Multiple other approaches may be shown and accuracy may be 85 percent out of 9 separate experiments.

In some embodiments, an SVM Radial Basis Function classifier is used as the classifier of the system. The Radial Basis Function (RBF) SVM classifier may be non-linear and the corresponding feature space may be referred to as a Hilbert space of infinite dimensions defined as:

$$k(x_i, x_j) = \exp(-\gamma \|x_i - x_j\|^2)$$

for $\gamma > 0$   Equ. 2

Equation 1 Gaussian radial basis function

The RBF Kernel, grid search for parameters may include:
A. Cost controls which may have the trade-off between allowing training errors and forcing rigid margins. Cost may vary between 0.1 and 7812.5, scaling by 5 each time. There may be a soft margin that may permit some misclassifications. Increasing the Cost may increase the cost of misclassifying points and may force the creation of a more accurate model that may not generalize well.
B. Gamma may be varied between 1e-5 to 113, scaling by 15 each time. The gamma parameter may determine the RBF width.

In one embodiment, a prediction may be obtained for Cost value of anywhere between 200 and 500, such as about 312.5 and Gamma value of about anywhere between 0.2 and 0.8, such as about 0.50625.

Table 2, illustrated below, presents a performance table of an embodiment of the present disclosure using the RBF.

TABLE 2

RBF Kernel performance Table for Gamma and Cost

| Gamma | Cost | | | | | | | |
|---|---|---|---|---|---|---|---|---|
| | 0.1 | 0.5 | 2.5 | 12.5 | 62.5 | 312.5 | 1562.5 | 7812.5 |
| 0.00001 | 11.9088 | 11.0895 | 11.0895 | 11.0895 | 11.0895 | 28.017 | 65.6136 | 83.3715 |
| 0.00015 | 11.9088 | 11.0895 | 11.0895 | 11.9163 | 48.0545 | 80.878 | 89.702 | 93.8928 |
| 0.00225 | 11.9088 | 11.0895 | 37.1109 | 72.714 | 88.26 | 93.2538 | 95.5032 | 96.3559 |
| 0.03375 | 29.7226 | 67.0234 | 85.2106 | 92.3481 | 96.3389 | 96.9349 | 96.868 | 96.7915 |
| 0.50625 | 83.73 | 93.0102 | 96.5956 | 98.0217 | 98.3722 | 98.1005 | 97.8376 | 97.8376 |
| 7.59375 | 73.5057 | 92.8436 | 95.8249 | 95.921 | 95.9305 | 95.8808 | 95.8312 | 95.8312 |
| 113.90625 | 11.3813 | 19.893 | 40.9047 | 40.9047 | 40.9047 | 39.7976 | 38.6905 | 38.6905 |

In some embodiments, the SMV Poly setting may be used. The Poly or Polynomial SVM classifier may be a non-linear and a hyperplane in the high-dimensional feature space, which may be defined as:

$$k(x_i, x_j) = (x_i \cdot x_j)^d$$   Equ. 3

Equation 2 Homogeneous Polynomial $$k(x_i, x_j) = (x_i \cdot x_j + 1)^d$$   Equ. 4

Equation 3 Inhomogeneous polynomial

In such an embodiment, the Polynomial Kernel Grid Search Parameter values may include:
A. Cost varied between 0.1 and 7812.5, scaling by 5.
B. Gamma which may serve as inner product coefficient in the polynomial. Gamma may be varied between 1e-5 and 113.90625, scaling by 15.
C. Degree of polynomial varied between 0.01 and 4, scaling by 7.
D. Coeff0 varied between 0.1 and 274.4, scaling by 3.

In one embodiment, a prediction of 97.64% may be obtained with a Cost value of between 0.3 and 0.7, such as for example 0.5, Gamma values of between 0.3 and 0.7, such as for example 0.50625, Degree of between 3.0 and 4.0, such as for example 3.43, and coeff0 of between 0.05 and 0.3, such as for example 0.1

Random Trees Parameter Selection may include:
  A. Tree Height varied between 2 and 64, scaling by 2.
  B. Features considered varied between 4 and 12, with a multiple step of 2.

In one embodiment, a prediction of 98.13% may be obtained for Max Tree Height 32 and 10 random Features.

| Features | Max Tree Height | | | | | |
|---|---|---|---|---|---|---|
| | 2 | 4 | 8 | 16 | 32 | 64 |
| 4 | 24.38 | 46.72 | 90.09 | 97.73 | 97.89 | 97.89 |
| 6 | 26.27 | 46.48 | 89.51 | 97.92 | 97.97 | 97.97 |
| 8 | 27.93 | 45.19 | 89.36 | 98.01 | 98.11 | 98.11 |
| 10 | 30.32 | 46 | 89.25 | 98.03 | 98.13 | 98.13 |
| 12 | 31 | 44.89 | 89.16 | 97.95 | 98.02 | 98.02 |

Table 3 (above) illustrates an embodiment of performance table with max tree height vs. features Referring now to the results in Table 4 (below), an embodiment is illustrated in which the system uses 70% random training and 30% testing. In one experiment, settings of various embodiments described earlier, including RBF kernel, Polynomial kernel and Random Tree are tested with 10 fold cross validation on the full dataset. The results of this testing are as presented below.

TABLE 4

Comparative results of embodiments of RBF, Polynomial, and Random Tree recognition results based on 70% random training and 30% random testing.

| | Samples | RBF | | POLY | | RandTREE | |
|---|---|---|---|---|---|---|---|
| | | Correct | Correct % | Correct | Correct % | Correct | Correct % |
| Run 1 | 61078 | 60323 | 98.76% | 60304 | 98.73% | 60491 | 99.04% |
| Run 2 | 62411 | 60486 | 96.92% | 59974 | 96.10% | 59202 | 94.86% |
| Run 3 | 62689 | 62339 | 99.44% | 61712 | 98.44% | 62358 | 99.47% |
| Run 4 | 59519 | 59041 | 99.20% | 58994 | 99.12% | 59013 | 99.15% |
| Run 5 | 64364 | 64112 | 99.61% | 63982 | 99.41% | 63873 | 99.24% |
| Run 6 | 58186 | 57681 | 99.13% | 57538 | 98.89% | 57551 | 98.91% |
| Run 7 | 64948 | 64006 | 98.55% | 63948 | 98.46% | 64484 | 99.29% |
| Run 8 | 63074 | 62671 | 99.36% | 62315 | 98.80% | 62764 | 99.51% |
| Run 9 | 53703 | 52425 | 97.62% | 52336 | 97.45% | 53321 | 99.29% |
| Run 10 | 57248 | 55519 | 96.98% | 55224 | 96.46% | 55508 | 96.96% |
| Total | 607220 | 598603 | 98.58% | 596327 | 98.21% | 598565 | 98.57% |

As the results may be presented in terms of various movements or gestures performed by the subjects and the rate of correct predictions for the given embodiments, Table 5 (shown below) presents data collected for the embodiments discussed where the scaled (and/or normalized) data is compared to the non-scaled (and/or non-normalized) data.

TABLE 5

Comparative results for RBF with and without scaling.

| | Scaled | | Not Scaled | |
|---|---|---|---|---|
| Gesture | Correct Prediction | Correct Prediction % | Correct Prediction | Correct Prediction % |
| AirGuitar | 7336 | 99.46% | 7356 | 99.73% |
| Archery | 6606 | 100.00% | 6606 | 100.00% |

TABLE 5-continued

Comparative results for RBF with and without scaling.

| | Scaled | | Not Scaled | |
|---|---|---|---|---|
| Gesture | Correct Prediction | Correct Prediction % | Correct Prediction | Correct Prediction % |
| Baseball | 3106 | 100.00% | 3106 | 100.00% |
| Boxing | 6128 | 100.00% | 6128 | 100.00% |
| Celebration | 1006 | 94.37% | 936 | 87.80% |
| Chicken | 3967 | 98.14% | 3437 | 85.03% |
| Clapping | 8006 | 100.00% | 7847 | 98.01% |
| Crying | 2887 | 96.01% | 2776 | 92.32% |
| Driving | 6518 | 100.00% | 6518 | 100.00% |
| Elephant | 1585 | 100.00% | 1585 | 100.00% |
| Football | 1621 | 100.00% | 1621 | 100.00% |
| HeartAttack | 1910 | 98.96% | 1895 | 98.19% |
| Laughing | 1747 | 99.15% | 1752 | 99.43% |
| Monkey | 1143 | 96.86% | 1140 | 96.61% |
| SkipRope | 943 | 77.11% | 1063 | 86.92% |
| Sleeping | 1816 | 100.00% | 1720 | 94.71% |
| Swimming | 1073 | 100.00% | 1073 | 100.00% |
| Titanic | 1290 | 100.00% | 1290 | 100.00% |
| Zombie | 2767 | 100.00% | 2767 | 100.00% |
| Overall | 61455 | 98.96% | 60616 | 97.67% |

Figure 9:
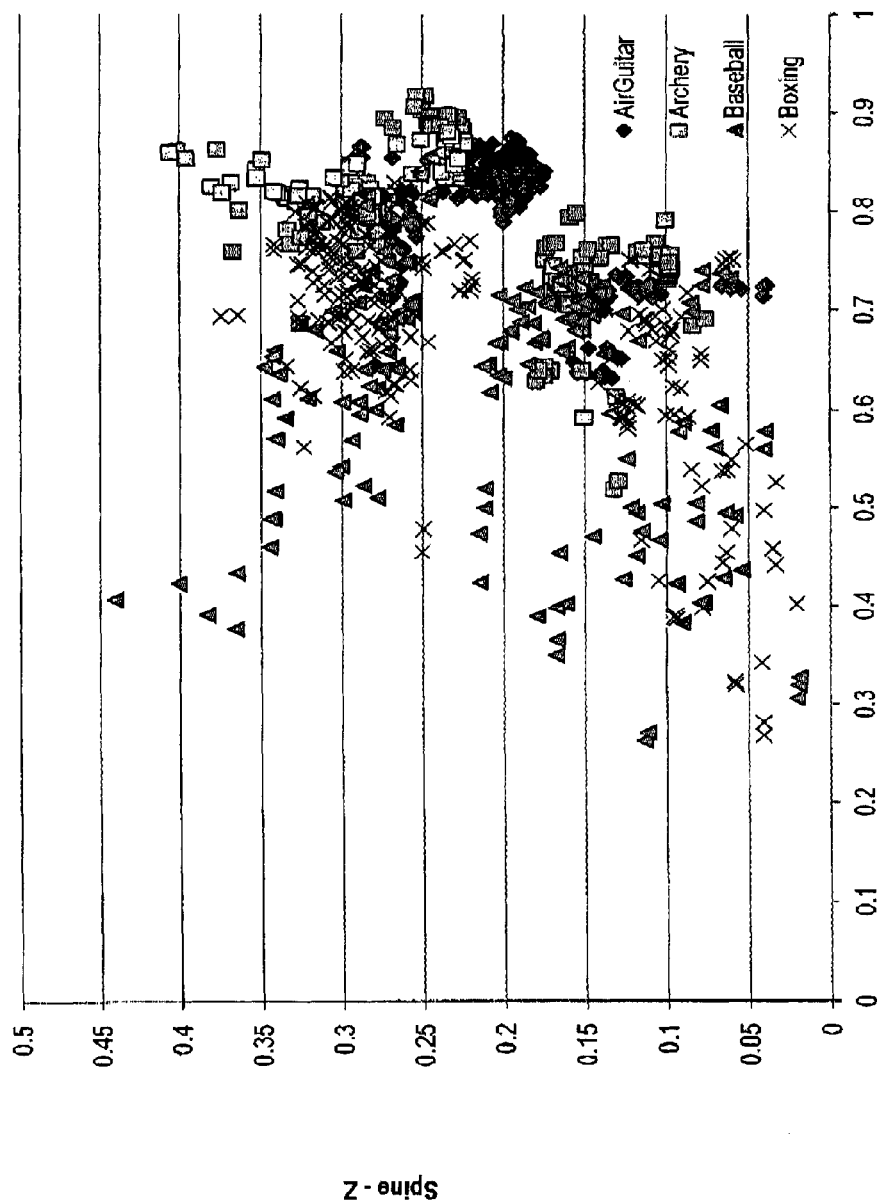
FIG. 9 illustrates an embodiment of data collected in an experiment.

Referring now to FIG. 9, data collected for an embodiment in which RBF SVM is used is illustrated. FIG. 9 shows a plot of the first 4 alphabetical classes. These results are plotted in two dimensions, using values from the z-axis of the spin and the y-axis of the loft foot. These axes were selected because the recognition system was prioritizing these points for accurate identification. FIG. 9 therefore shows support vectors in feature space. In this particular test and for this particular embodiment of the invention, a Y co-ordinate of left foot and a Z co-ordinate of a spine are found to be the most useful features while classifying gestures of various body parts.

In some embodiments, to speed up the system in terms of real-time recognition implementations a technique may be used in which display recognition results for only live of the 20 gestures are used, while the other 15 were grouped together as an "idle" gesture. In further embodiments, averaging the gesture over several frames, such as 10 frames at a time, creating a fixed minimum threshold, repeating this process 2-3 times, and averaging those results under another minimum threshold may be used before providing a recognition value.

The above discussed embodiments of systems and methods present series of approaches to complex real-time gesture recognition. These approaches may be used with any type and form of detectors, such as depth cameras, RGB cameras, or mark based tracking. The results of the tests show, in some embodiments, accuracy of greater than 98 percent. The embodiments may comprise a number of different learning algorithms (i.e. three different classifiers and/or recognizers).

I claim:

1. A method of identifying a movement of a subject based on data, the method comprising:
   receiving at a network interface, a stream of frames comprising gesture data, each frame of the stream of frames identifying positions of one or more body parts of a subject with respect to the waist of the subject's body, the stream of frames being stored in storage memory;
   extrapolating, by a processor, from the stream of frames comprising gesture data, one or more frames corresponding to a first movement;
   assigning, by a classifier, the one or more frames to the first movement, the classifier applying a scale invariant feature transform is used to determine a descriptor of the first movement;
   dividing, by the processor using a self-organizing map, the stream of frames into separate phases;
   identifying, by the processor using a scalar vector machine, transition conditions within a feature space between phases;
   receiving, by the network interface, a new gesture data identifying positions of one or more body parts of a new subject with respect to the waist of the new subject's body;
   extrapolating, by a processor, from the new gesture data one or more frames comprising gesture data identifying one or more features of the body movement of the new subject;
   determining, by the processor, that movement of the new subject corresponds to the first movement responsive to comparing at least a portion of the new gesture data to at least a portion of the gesture data of the one or more frames corresponding to a first movement by applying at least both the descriptor provided by the scale invariant feature transform and the transition conditions identified by the scalar vector machine.

2. The method of claim 1, further comprising identifying, by the processor, within a first threshold of accuracy that the at least the portion of the new gesture data matches the at least the portion of the gesture data, and
   further determining that the movement of the new subject is the first movement based on the identification within the first threshold.

3. The method of claim 2, further comprising:
   additionally identifying, by the processor, within a second threshold of greater certainty than the first threshold of certainty that at least a second portion of the new gesture data matches at least a second portion of the gesture data, and
   further determines with a greater certainty that the movement of the new subject corresponds to the first movement based on the identification within the second threshold; wherein the first threshold is used in determining a fixed minimum threshold by averaging the gesture across the stream of frames, and wherein the second threshold is used to provide a separate minimum threshold that is used to provide a recognition value.

4. The method of claim 1, further comprising determining that the movement of the new subject corresponds to the first movement responsive to comparing one or more features of the gesture data of the frame to the one or more features of the new gesture data.

5. The method of claim 1, further comprising:
   receiving a plurality of frames comprising gesture data via the network from a plurality of users at different geographical locations,
   receiving the frame via the network from a user of the plurality of users,
   storing the gesture data comprising the frame in a database, and
   retrieving the frame from the database upon detecting that gesture data in the frame substantially matches the new gesture data.

6. The method of claim 1, further comprising comparing, by the processor, a feature of the new gesture data identifying a position of a shoulder of the new subject with respect to the new subject's waist to a feature of the gesture data in the frame identifying the position of a shoulder of the subject with respect to the subject's waist.

7. The method of claim 1, further comprising comparing, by the processor, a feature of the new gesture data identifying a position of a hip of the new subject with respect to the new subject's waist to a feature of the gesture data in the frame identifying the position of a hip of the subject with respect to the subject's waist.

8. The method of claim 1, further comprising comparing, by the processor, a feature of the new gesture data identifying a position of an elbow of the new subject with respect to the new subject's waist to a feature of the gesture data in the frame identifying the position of an elbow of the subject with respect to the subject's waist.

9. The method of claim 1, further comprising comparing, by the processor, a feature of the new gesture data identifying a position of a palm of the new subject with respect to the new subject's waist to a feature of the gesture data in the frame identifying the position of a palm of the subject with respect to the subject's waist.

10. The method of claim 1, further comprising comparing, by the processor, a feature of the new gesture data identifying a position of one or more fingers of the new subject with respect to the new subject's waist to a feature of the gesture data in the frame identifying the position of one or more fingers of the subject with respect to the subject's waist.

11. The method of claim 1, further comprising comparing, by the processor, a feature of the new gesture data identifying a position of a knee of the new subject with respect to the new subject's waist to a feature of the gesture data in the frame identifying the position of a knee of the subject with respect to the subject's waist.

12. The method of claim 1, further comprising comparing, by the processor, a feature of the new gesture data identifying a position of a heel of the new subject with respect to the new subject's waist to a feature of the gesture data identifying the position of a heel of the subject with respect to the subject's waist.

13. The method of claim 1, further comprising comparing, by the processor, a feature of the new gesture data identifying a position of toes of the new subject with respect to the new subject's waist to a feature of the gesture data identifying the position of toes of the subject with respect to the subject's waist.

14. The method of claim 1, further comprising comparing, by the processor, a feature of the new gesture data identifying a position a portion of the head of the new subject with respect to the new subject's waist to a feature of the gesture data in the frame identifying the position of a portion of the head of the subject with respect to the subject's waist.

15. The method of claim 1, further comprising comparing, by the processor, a feature of the new gesture data identifying a position of the neck of the new subject with respect to the new subject's waist to a feature of the gesture data in the frame identifying a position of the neck of the subject with respect to the subject's waist.

16. The method of claim 1, further comprising comparing, by the processor, a feature of the new gesture data identifying a position of a pelvis of the new subject with respect to the new subject's waist to a feature of the gesture data in the frame identifying the position of a pelvis of the subject with respect to the subject's waist.

17. The method of claim 1, further comprising comparing, by the processor, a feature of the new gesture data identifying a position of a belly of the new subject with respect to the new subject's waist to a feature of the gesture data in the frame identifying the position of a belly of the subject with respect to the subject's waist.

18. The method of claim 1, further comprising receiving, by the network interface from a detector, the frame comprising gesture data, the detector comprising a camera comprising a functionality to extrapolate self-referential gesture data, and receiving, by the processor, from a different detector the new gesture data, the different detector comprising a different camera that comprises the functionality to extrapolate self-referential gesture data.

19. A system for identifying a movement of a subject based on data, the system comprising:
a database storing a stream of frames received at a network interface, each frame of the stream of frames comprising gesture data identifying positions of one or more body parts of a subject with respect to the waist of the subject's body;
a processor configured to extrapolate, from the the stream of frames comprising gesture data, one or more frames corresponding to a first movement, wherein the processor is configured to divide the stream of frames into separate phases using a self-organizing map, and wherein the processor is configured to identify, using a scalar vector machine, transition conditions within a feature space between phases;
a classifier configured to assign the one or more frames to a first movement, the classifier configured to apply a scale invariant feature transform to determine a descriptor of the first movement;
the network interface being configured to receive a new gesture data identifying positions of one or more body parts of a new subject with respect to the waist of the new subjects body;
the processor configured to extrapolate from the new gesture data one or more frames comprising gesture data identifying one or more features of the body movement of the new subject;
the processor further configured to determine that a movement of the new subject corresponds to the first movement responsive to comparing at least a portion of the new gesture data to the at least a portion of the new gesture data in the one or more frames of the stream of frames stored in the database.

20. The system of claim 19, wherein the processor is configured to determine within a first threshold of certainty that the movement of the new subject corresponds to the first movement.

21. The system of claim 20, further comprising:
the processor additionally configured to determine within a second threshold of greater certainty than the first threshold, that the movement of the new subject corresponds to the first movement responsive to a comparison of the new gesture data to a second frame assigned to the first movement;
wherein the first threshold is used in determining a fixed minimum threshold by averaging the gesture across the stream of frames, and wherein the second threshold is used to provide a separate minimum threshold that is used to provide a recognition value.

22. The system of claim 19, wherein processor is configured to determine that the movement of the new subject corresponds to the first movement responsive to a comparison of the one or more positions of the frame to the one or more positions of the new gesture data.

23. The system of claim 19, wherein the processor is configured to determine that the movement of the new subject corresponds to the first movement responsive to a comparison of the one or more positions identified by the new gesture data to the one or more positions identified by the gesture data in the frame.

24. The system of claim 19, wherein a plurality of frames comprising the gesture data are received via the network from a plurality of users at different geographical locations, and wherein the frame is received via the network from a user of the plurality of users.

25. The system of claim 19, wherein the network interface is configured to receive from a detector the frame comprising gesture data, the detector comprising a camera comprising a functionality to extrapolate self-referential gesture data, and wherein the processor receives from a different detector the new gesture data, the different detector comprising a different camera that comprises the functionality to extrapolate self-referential gesture data.

26. The method of claim 1, wherein the classifier engine utilizes a radial basis function scalar vector machine.

27. The method of claim 26, wherein the feature space of the radial basis function scalar vector machine has a Hilbert space of infinite dimensions defined as:

$$k(x_i, x_j) = \exp(-\gamma \|x_i - x_j\|^2)$$

for $\gamma > 0$.

28. The method of claim 26, wherein the scalar vector machine is non-linear and utilizes a hyperplane that is defined as:

$$k(x_i, x_j) = (x_i \cdot x_j)^d \text{ or } k(x_i, x_j) = (x_i \cdot x_j + 1)^d.$$

* * * * *